US006795450B1

(12) United States Patent
Mills et al.

(10) Patent No.: US 6,795,450 B1
(45) Date of Patent: Sep. 21, 2004

(54) METHOD AND APPARATUS FOR SUPPORTING PHYSICAL LAYER LINK-SUSPEND OPERATION BETWEEN NETWORK NODES

(75) Inventors: Andrew Mills, Coto De Caza, CA (US); Ralph Andersson, Grass Valley, CA (US)

(73) Assignee: TDK Semiconductor Corporation, Tustin, CA (US)

(*) Notice: Subject to any disclaimer, the term of this patent is extended or adjusted under 35 U.S.C. 154(b) by 791 days.

(21) Appl. No.: 09/676,040

(22) Filed: Sep. 28, 2000

(51) Int. Cl.[7] .............................................. H04L 12/66
(52) U.S. Cl. ...................... 370/463; 370/419; 370/503; 713/300
(58) Field of Search ................................ 370/463, 503, 370/509, 318, 401, 465, 466, 459, 458, 450, 229, 311, 231, 394, 419, 420, 522; 713/300, 320, 323, 324, 330, 340

(56) References Cited

U.S. PATENT DOCUMENTS

| 5,440,556 A | | 8/1995 | Edem et al. ................. 370/465 |
|---|---|---|---|
| 5,560,021 A | * | 9/1996 | Vook et al. .................. 713/323 |
| 5,805,597 A | | 9/1998 | Edem .......................... 370/445 |
| 6,085,325 A | * | 7/2000 | Jackson et al. ............. 713/300 |
| 6,343,216 B1 | * | 1/2002 | Kim et al. ................... 455/450 |

FOREIGN PATENT DOCUMENTS

| EP | 0 573 204 | 12/1993 |
|---|---|---|
| EP | 0 650 279 | 4/1995 |
| EP | 0 777 172 | 6/1997 |

OTHER PUBLICATIONS

Advanced Configuration and Power Interface Specification, Revision 1.0b, Feb. 2, 1999, pp. 20, 25–38, 42–48, 65, 119, 141, 206, 225–231, 235, 272–275, 283, 292, 375–376 [online]. Intel Corporation, Microsoft Corporation, and Toshiba Corp. [retrieved on Apr. 10, 2001]. Retrieved from the Internet: <URL: http://www.teleport.com/~acpi/spec10b.htm/22.

Magic Packet Technology White Paper, Revision A, Nov. 1995 [online]. Advanced Micro Devices, Inc. [retrieved on May 7, 2001]. Retrieved from the Internet: <URL: http://www.amd.com/products/npd/overview/onnow.html>.

(List continued on next page.)

Primary Examiner—Brian Nguyen
(74) Attorney, Agent, or Firm—The Hecker Law Group, PLC

(57) ABSTRACT

A link-suspend operation between network nodes in a point-to-point data communications link is presented. Individual network links will have a full power operational mode for supporting full high-bandwidth communication, and a low power "link-suspend" (LS) operational mode for temporary operation when only limited communication is occurring. The communications link is maintained, while cycling transmitter power on and off during idle periods with a duty cycle that substantially reduces physical layer device (PHY) power, using LSPs. LS mode may be negotiated by advertising capabilities between two network devices. Thus, PHYs at either end of a link can notify the other of the capability to support a LS mode of operation and can negotiate parameters for communications using the LS mode. Further, transmitting and receiving continuous idles, valid data frames, and Wake-on LAN (WOL) packets is supported. Similarly, notification of "wake-up" schemes and detection of suspended WOL network device is supported.

47 Claims, 10 Drawing Sheets

OTHER PUBLICATIONS

OnNow Network Device Class Power Management Reference Specification, V1.0, Mar. 4, 1997 [online]. Microsoft Corporation and Advanced Micro Devices, Inc. [retrieved on May 7, 2001]. Retrieved from the Internet: <URL: http://www.amd.com/products/npd/overview/onnow.html>.

Networking—Wake up to Wake-on-LAN [online]. International Business Machines Corporation 1996 [retrieved on May 7, 2001]. Retrieved from the Internet: <URL: http://www.networking.ibm.com/eji/ejiwake.html>.

Intel Networking—Wake on LAN [online]. Intel Corporation 2001 [retrieved on May 7, 2001]. Retrieved from the Internet: <URL: http://www.intel.com/network/technologies/wake_on_lan.htm>.

Wake-On-LAN Overview [online]. ASUSTek Computer, Inc. [retrieved on May 7, 2001]. Retrieved from the Internet: <URL: http://www.asus.com.tw/Products/techref/Wol/wol.html>.

Donald Becker, Using Wake-on-LAN with Linux, Wake-On-LAN Technology [online]. Scyld Computing Corporation [retrieved on May 7, 2001]. Retrieved from the Internet: <URL: http://www.scyld.com/expert/wake-on-lan.html>.

Question and Answer, Wake-On-LAN [online]. ASUSTeK Computer Inc. [retrieved on May 7, 2001]. Retrieved from the Internet: <URL: http://www.asuscom.de/Products/Techref/Wol/qa.html>.

Wake on LAN—an Administrator's Perspective, Networking [online]. International Business Machines Corporation 1997 [retrieved on May 7, 2001]. Retrieved from the Internet: <URL: http://www.networking.ibm.com/tra/trawolwp.html>.

Wake-on-LAN, Webopedia Definition and Links [online]. Internet.com Corp. 2001 [retrieved on May 7, 2001]. Retrieved from the Internet: <URL: http://www.pcwebopaedia.com/TERM/W/Wake_on_LAN.html>.

Wake On LAN (WOL), AppDeploy.com: FAQ [online]. RWK Systems, Inc. 1999 [retrieved on May 7, 2001]. Retrieved from the Internet: <URL: http://www.appdeploy.com/faq/wol.shtml>.

Power Management for Network Devices, Aug. 20, 1999 [online]. Microsoft Corporation [retrieved on May 8, 2001]. Retrieved from the Internet: <URL: http://www.microsoft.com/HWDEV/devdes/netpm.htm>.

Power Management for Network Devices, Nov. 16, 1998 [online]. Microsoft Corporation [retrieved on May 8, 2001]. Retrieved from the Internet: <URL: http://msdn.microsoft.com/library/backgrnd/html/netpm.htm>.

OnNow and Power Management, May 7, 2001 [online]. Microsoft Corporation [retrieved on May 8, 2001]. Retrieved from the Internet: <URL: http://www.microsoft.com/hwdev/onnow/default.htm>.

* cited by examiner

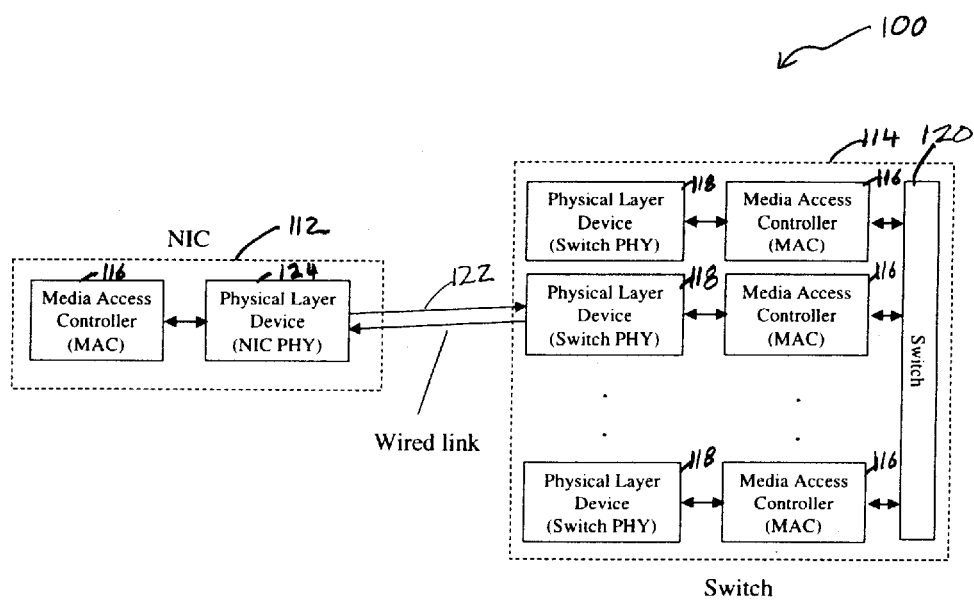
Fig 1: Typical Prior LAN System, Showing Key Functional Components

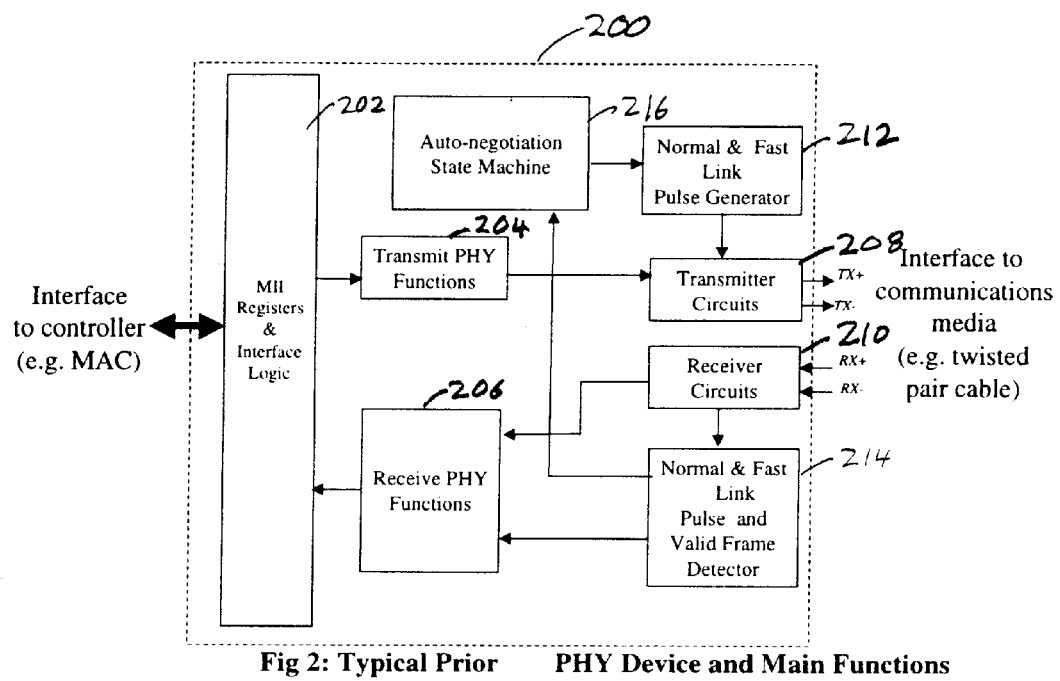
Fig 2: Typical Prior PHY Device and Main Functions

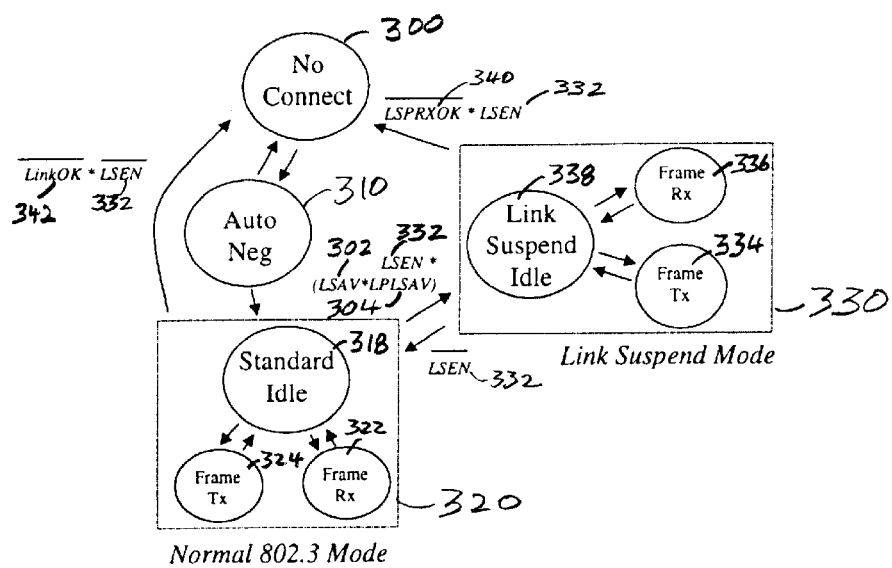
Figure 3: Example High Level Operational States of a Link-suspend PHY (Half Duplex Case)

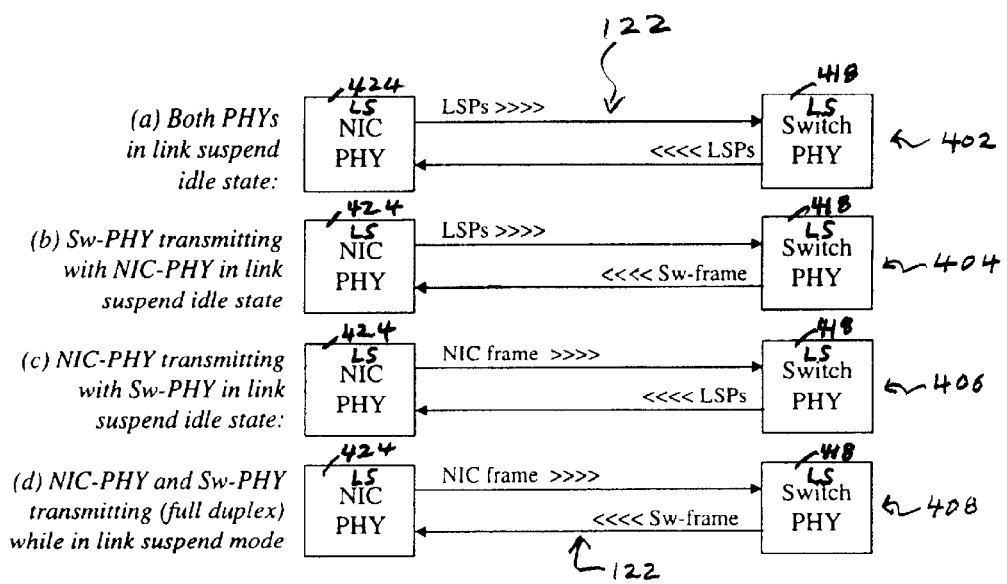
Figure 4: Example Operational States While in Link-suspend Mode

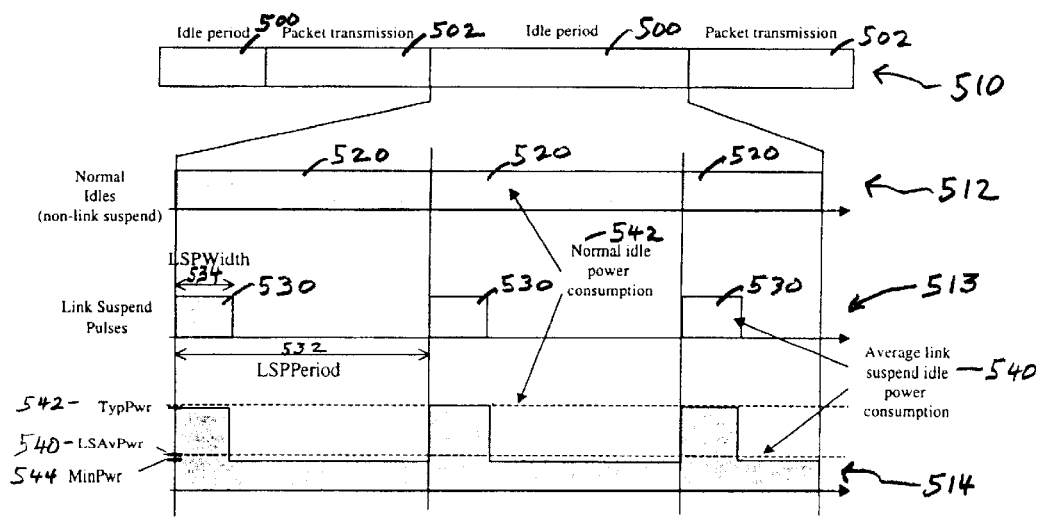
Figure 5: Link Suspend Pulse (LSP) Characteristics

| Register Function | Register Definition 600 | | | | | | | | | |
|---|---|---|---|---|---|---|---|---|---|---|
| Suspend Msg ID 602 | Reserved | LSMsgID[0..10] | | | | | | | | |
| Link Parter Status 604 | Rsvd | LP WakeUp Code[0..2] | LP LSPWidth [0..3] | LP LSPExp [0..1] | LP LSPPeriod [0..1] | Rsvd | LP LSP Mode | LP LSAV | Rsvd | |
| LS Control 606 | LS AN | WakeUp Code[0..2] | LSPWidth [0..3] | LSPExp [0..1] | LSPPeriod [0..1] | Rsvd | LSP Mode | LSAV | LSEN | |
| | D15 | D14 | | | | | | | | D0 |

Figure 6: Example LS Modified MII Register Definition for Link Suspend Parameters

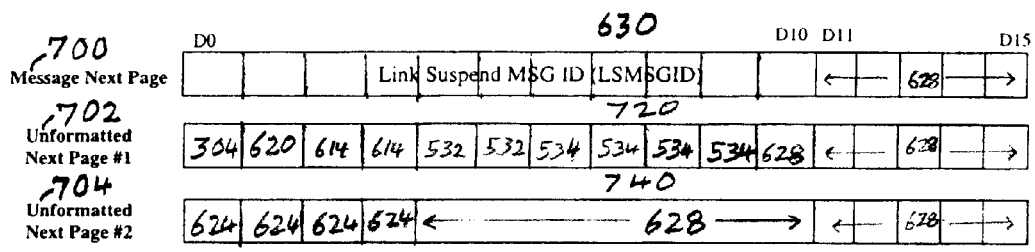
Figure 7: Auto-negotiation Next Page Message and Link-suspend Next Page Code Word

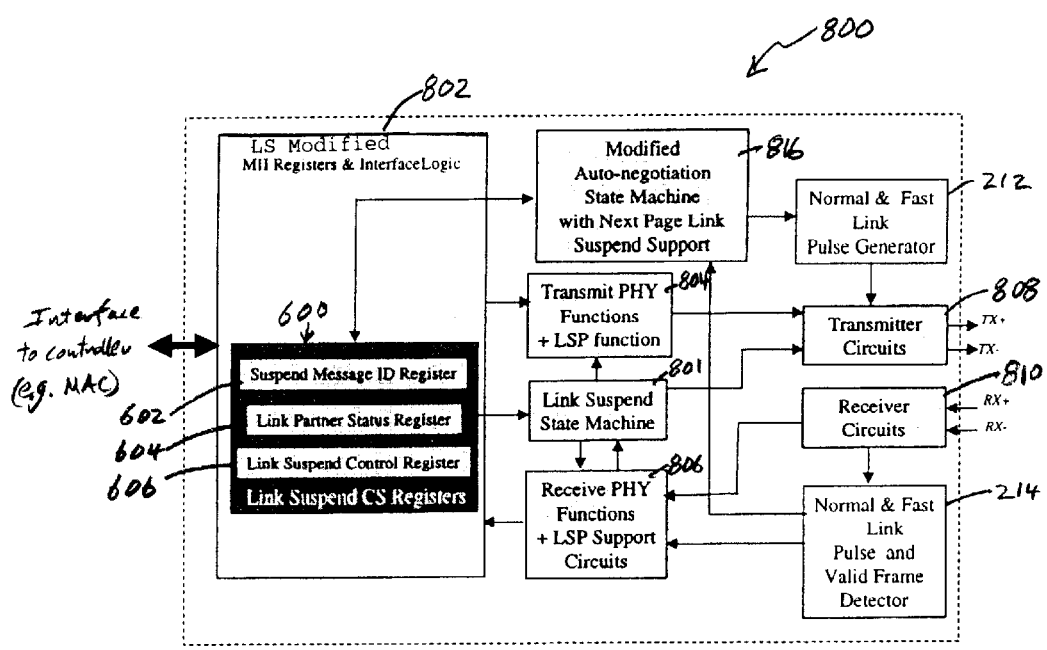
Fig 8: Modified PHY With Invention Implemented

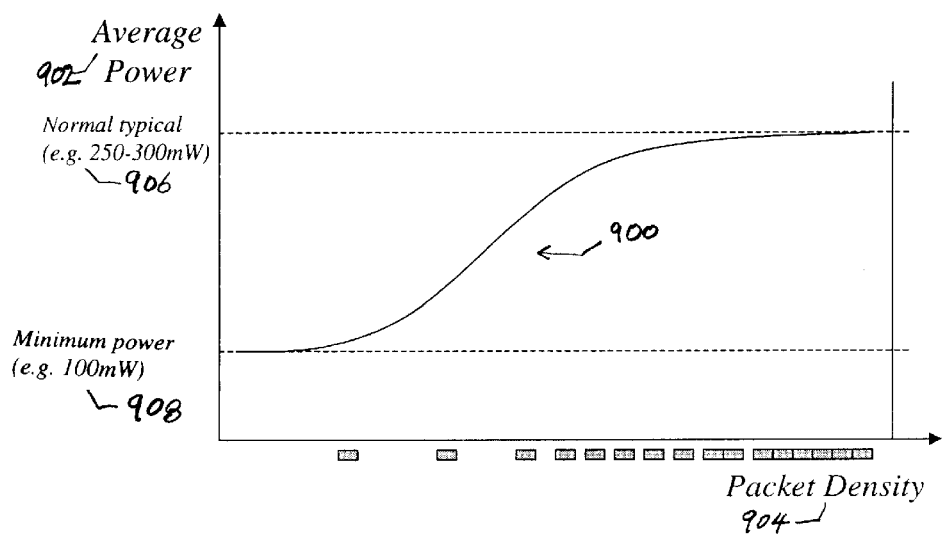
Figure 9: Average PHY Power Consumption vs. Packet Density

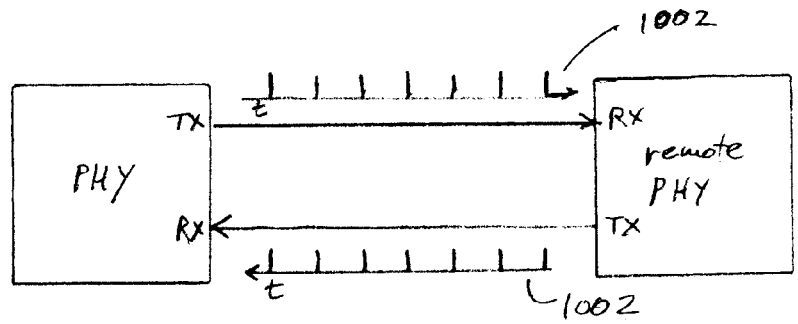
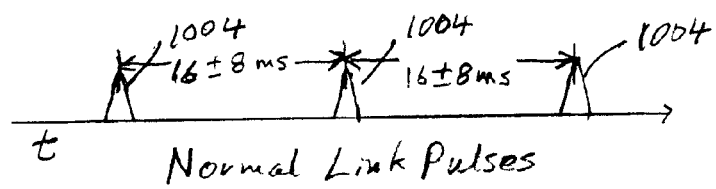
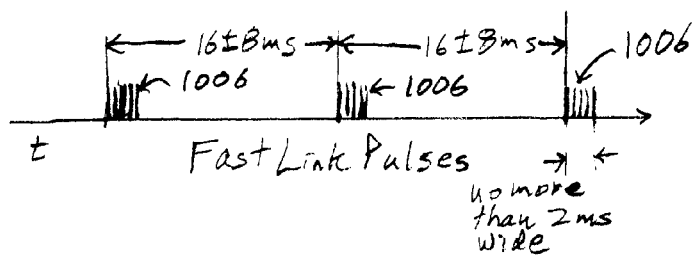
Figure 10

METHOD AND APPARATUS FOR SUPPORTING PHYSICAL LAYER LINK-SUSPEND OPERATION BETWEEN NETWORK NODES

BACKGROUND OF THE INVENTION

1. Field of the Invention

This invention relates to the field of computer network point to point data communications, and more particularly to communications links that normally use constant idle bit streams between packet transmissions.

2. Background a. Communications Networks

There are many different types of networks, network systems, and network devices for sharing files and resources or for otherwise enabling communication between two or more computers, PCs (personal computers), workstations, telephones, etc. The term "network device", "network node" or "network component" generally refers to a computer linked to a network via a network interface card (NIC), or refers to other devices or apparatus that perform specialized functions in the network, such as repeaters, bridges, switches, routers, brouters, to name a few examples. Networks may be categorized based on various features and functions. For example, the range of a network refers to the distance over which nodes are distributed, such as local-area networks (LANs) within an office or floor of a building, wide-area networks (WANs) spanning across a college campus, or a city or a state, and global-area networks (GANs) spanning across national boundaries.

In designing a network, there are a large number of possible network configurations (such as ring, tree, star, hybrid combinations of these, etc.) and communication protocols (such as analog or digital and isochronous or non-isochronous) from which to choose. For example, a star-topology network has data sources and sinks coupled to nodes and the nodes are coupled to a central hub in a star topology. Each node (which may have one or more data sources and sinks coupled thereto) assembles the data received from the one or more data sources coupled to it into the designated frame template and transmits it to the hub.

Many networks operate in accordance with the OSI (Open Systems Interconnection) Reference Model, which is a seven-layer model developed by the ISO (International Standardization Organization). The OSI Reference Model describes how to interconnect any combination of network devices in terms of seven functional layers organized in a hierarchy, and specifies the functions that must be available at each layer. From highest level of the hierarchy to lowest level of the hierarchy, the OSI Reference Model includes the Application layer, the Presentation Layer, the Session Layer, the Transport Layer, the Network Layer, the Data-Link Layer and the Physical Layer.

Network architectures (such as Ethernet, ARCnet, Token Ring, and FDDI) encompass the Data-Link and Physical Layers and represent the most common protocols used. The Data Link layer is responsible for constructing and transmitting data packets as well as receiving and deconstructing data packets, both sequences based upon the network architecture being employed. The Data-Link layer provides services for the various protocols at the Network Layer and uses the Physical Layer to transmit and receive the data packets. In a Local Area Network Carrier Sense Multiple Access with Collision Detection (LAN CSMA/CD) implementation according to the Institute of Electrical and Electronics Engineers, Inc. (IEEE) Standard 802.3 or 802.3u-1995 (IEEE Standards) (See IEEE 802.3 Standard for Carrier Sense Multiple Access with Collision Detect (CSMA/CD) Access method and Physical Layer Specifications, 1998 Edition), the Data-Link Layer is divided into two sub-layers, the Logical-Link Control (LLC) sub-layer at the top and the Media-Access Control (MAC) sub-layer at the bottom. The LLC sub-layer provides an interface for the Network Layer protocols while the MAC sub-layer provides access to a particular physical encoding and transport scheme of the Physical Layer. The MAC sub-layer is typically executed by a MAC device that operates at one of several standard clock frequencies. Similarly, the Physical Layer is typically executed by a Physical Layer Device (PHY) that is responsible for transmitting and receiving digital code from a communications media or line, and converting the digital signals into higher intelligence signals for the device MAC.

Several structures and protocols are known for implementing the Data Link (e.g. a MAC) and Physical Layers (e.g. a PHY). Ethernet using coaxial, twisted pair or fiber-optic cables operates at 10 megabits per second (Mbps) (e.g. 10BASE-T, 10BASE-F) while fast Ethernet operates at 100 Mbps (e.g. 100BASE-T, 100BASE-FX). ARCnet (Attached Resource Computer Network) is a relatively inexpensive network structure using coaxial, twisted pair or fiber-optic cables operating at 2.5 or 20 Mbps. Token Ring topologies use special IBM cable or fiber-optic cable and operate between 1 and 16 Mbps. Fast Token Ring operates at 100 Mbps. A new standard is being developed called ATM (Asynchronous Transfer Mode), which operates at speeds of 25.6 or 155 Mbps, although newer versions may operate at even higher data rates. Of course, various other network structures are known and available.

Over the years, many networks have been designed to operate in 10BASE-T protocol. However, as faster and more sophisticated communication became possible through improvements in equipment and technology, it has become desirable to provide multi-service protocols which can support both older protocols, such as 10BASE-T, as well as additional communication protocols such as those listed above. This is so that it is not necessary to replace the entire network and related components with new equipment when upgrading to the newer protocol.

During network communications, the Physical Layer (e.g. a PHY) receives data packets from the Data-Link Layer (e.g. a MAC) above it and converts the contents of these packets into a series of electrical signals that represent 0 and 1 values in a digital transmission. These signals are sent across a transmission medium to a partner Physical Layer at the receiving end of the network link. At the destination, the partner Physical Layer (e.g. a PHY) converts the electrical signals into a series of bit values, which are grouped into packets and passed up to the Data-Link Layer (e.g. a MAC) of the destination device by the Physical Layer (e.g. a PHY) of the destination partner network device.

b. Prior LAN Systems

FIG. 1 is a block diagram of a typical prior LAN system 100 showing key functional components. It illustrates one of the most common IEEE 802.3 Ethernet communications links, which requires two PHY layer devices (e.g. a network interface card (NIC) 112 and a Switch device 114) in order to communicate. The Switch device comprises a switch 120 connected to media access controllers (MACs) 116, which are in turn connected to switch physical layer devices (Switch PHYs) 118, which are connected to a wired link 122. Similarly, the NIC 112 comprises a media access controller (MACs) 116 connected to a NIC physical layer device (NIC PHYs) 124, which is also connected to the wired link 122.

The switch device media access controllers (MACs) 116 provide data media to the switch device physical layer devices (Switch PHYs) 118, which in turn transmit and receive data from the wired link 122. Similarly, the NIC 112 media access controller (MACs) 116 providing data media to the NIC physical layer device (NIC PHYs) 124, which in turn transmits and receives data from the wired link 122. Thus, by using a communications language, mode, or protocol that the other "partner" understands, the switch and NIC are able to "talk" to each other over the "link".

The wired link 122, or media connecting two PHYs normally consists of two twisted-pair cables, with one pair utilized for receiving data and the other for transmitting data. However, various other appropriate wired link 122 media may be used to connect PHYs, such as coax cable, fiber optic cable, satellite links, cell links, radio waves, etc.

c. Physical Layer Devices (PHYs)

FIG. 2 is a block diagram of a typical prior physical layer device (PHY) 200 showing key functional components. The same basic PHY circuits can be utilized in both a network interface card (NIC), a Switch PHY circuit, as well as other network devices using various media as discussed above. Similarly, a PHY may be implemented either as a standalone single or multi-channel (e.g. 4 PHYs on a chip) device, or an integral component within a higher integrated controller that has PHY devices. The PHY function may also be implemented using a variety of an integrated circuit technology. For example, PHY functionality may be provided through a predominantly analog circuit approach or through use of a digital signal processor.

As shown in FIG. 2, a Media Independent Interface (MII) Registers and Interface Logic component 202 is connected to a transmit PHY functions component 204, and a receiver PHY functions component 206. In turn, the transmit PHY functions component 204 is connected to transmitter circuits 208. The transmitter circuits 208 are connected to a wired link 122. Likewise, the receiver PHY functions component 206 is connected to a normal and fast link pulse and valid frame detector 214, and receiver circuits 210. The receiver circuits 210 are in turn connected to the wired link 122. The transmitter circuits 208 are also connected to a normal and fast link pulse generator 212. The receiver circuits 210 are connected to a normal and fast link pulse and valid frame detector 214. An auto-negotiation state machine 216 is attached to the normal and fast link pulse generator 212, and the normal and fast link pulse and valid frame detector 214.

As part of the IEEE 802.3 standard, the MII Registers and Interface Logic component 202 provides a common interface for connecting the PHY 200 with a MAC. The MII is capable of interfacing the PHY with different types of standardized MACs so that different vendors can design standardized products that will successfully interface.

The transmit PHY functions component 204 controls the transmitter circuits 208, which transmit across the wired link 122. Likewise, the receiver PHY functions component 206 controls the receiver circuits 210, which receive data from the wired link 122.

The normal and fast link pulse generator 212 provides normal link pulses (NLPs) and fast link pulses (FLPs) used to confirm PHY connection to other "partner" or "remote" PHY's. For example, the PHY normal and fast link pulse generator 212 will generate NLPs which are then transmitted across the wired link 122 to tell a remote PHY that the transmitting PHY is still connected (i.e. an "I'm here" signal). Herein, the PHY under discussion will be referred to as simply "PHY" and a PHY at the other end of a link will be referred to as a "partner PHY" or "remote PHY". Unless stated otherwise, a partner or remote PHY behaves in the same manner as the PHY described within.

Similarly, the normal and fast link pulse and valid frame detector 214 provides normal and fast link detection for confirming a valid link with another PHY. For example, when NLPs received from the wired link 122 by the PHY receiver are detected by the normal and fast link pulse and valid frame detector 214, a valid link with the remote PHY transmitting the NLPs is confirmed. Thus, for 10-BASE-T communications, the indication to a remote PHY receiving and detecting NLP's is that all is well on the link. On the other hand, if no pulses are received by an expecting remote PHY, the link is assumed dead.

The auto-negotiation state machine 216 provides to the pulse generator 212 and recognizes from the pulse and frame detector 214, various parameters used to set up the operational mode of the communications link. For instance, the method of communication between two PHYs can be either half-duplex (receive or transmit only) or full-duplex (receive and transmit simultaneously). In addition, the auto-negotiation block sets up other parameters such as the speed of the link (e.g. 10 Mbps, 100 Mbps or 1000 Mbps), as well as the type of signaling and encoding schemes used (e.g. 100BASE-T4, 100BASE-T2). The IEEE 802.3 Standard auto-negotiation Section (IEEE Std 802.3, 1998 Ed., Section 28) provides for negotiation between two network endpoints. For example, the IEEE specifies protocol used by a linked node and hub to select a link configuration compatible to both endpoints. Thus, the auto-negotiation block is responsible for negotiating with its remote PHY partner to achieve the desired mode of operation.

The type of pulses used by a PHY to negotiate a link vary depending on the type of PHY. For example, at power on, an old standard 10BASE-T, 10 Mbps capacity PHY will transmit Normal Link Pulses (NLPs). Thus any PHY receiving NLPs is informed that it is communicating with a 10BASE-T partner, and will continue operations in 10BASE-T mode. In 10BASE-T mode, NLPs are transmitted during link negotiation as well as when the link is idle (e.g. when no data packets are being transmitted). Consequently, the NLP is known as the "link integrity pulse" or "link test pulse".

Newer 10BASE-T PHYs and 100BASE-T PHYs use Fast Link Pulses (FLPs) during link set up. FLPs allow for the passage of auto-negotiation parameters. In addition, FLPs are designed to be interpreted as NLPs by non-FLP capable PHYs. Thus, to an old 10BASE-T PHY, FLPs used during link negotiation will look like NLPs. Conversely, a newer 10BASE-T PHY will be capable of transmitting and interpreting Fast Link Pulses (FLPs), and hence will be able to detect both 10BASE-T and 100BASE-T modes of operation.

FIG. 10 is a waveform diagram of link negotiation pulses showing NLPs and FLPs, in accordance with an embodiment of the invention. Referring to FIG. 10, pulses 1002 are sent by both PHYs during link negotiation. NLPs, typically consist of a pulses 1004 sent every 16±8 ms. However, FLPs typically consist of bursts of pulses 1006, no more than 2 ms in duration, sent every 16±8 ms. Generally, each FLP burst of pulses 1006 consists of a series of clock and data pulses. The data pulses usually carry link negotiation data indicating link speed, duplex mode, etc.

Hence, during auto negotiation, higher speed PHYs exchange information identifying what type of PHY they are and what their communications mode capabilities are. For instance, at power on, a Fast Ethernet (100BASE-T) capable PHY will startup by pulsing the media line with Fast Link Pulses (FLP) to inform remote PHYs of its existence on the line. A remote PHY will operate in a similar fashion, pulsing the media line with FLPs. When a return FLP is received by the powered on PHY, that PHY will detect the FLPs, decipher the data bits encoded therein, and identify the transmitted parameters. Generally, current systems allow the PHYs to "advertise" in this manner what mode each is capable of. The highest common operational mode is then chosen. For example, if one of the PHYs advertises 10BASE-T full duplex and the other PHY advertises 100BASE-TX full duplex, the PHY advertising 100BASE-TX will reconfigure its advertisements to the lower 10BASE-T full duplex capability.

Also, auto negotiation generally only occurs following a reset, or typically following a link failure or power up. Thus, once a link has been auto negotiated, the PHYs retain the communications mode agreed upon even though other parameters or modes may change during communications. For instance, to and from a data transmission state and an idle state.

In prior systems, a first PHY must continually transmit a signal waveform in order to maintain the link with a partner PHY at the other end for two reasons. First, the partner PHY will assume the link is severed if an identifiable waveform of signal is not received for a certain length of time, and second, the partner PHY receiver may loose its "lock" on the timing of the incoming waveform's bits and thus will not be able to decipher them. Thus, when data packets are not being transmitted over the link to a remote PHY, some other type of signal or pulse must be sent.

The type of pulses used by a PHY in between data packet transmissions varies depending on the mode of operation negotiated for that link. For example, if the link operational mode is 10BASE-T, a PHY will transmit Normal Link Pulses (NLPs) in between data packets. In this case, each PHY must continually transmit NLPs between data packets (or FLPs to be interpreted as NLPs) or the partner PHY will assume the link is severed because no identifiable signal has been received for a "timeout" period.

Alternatively, if the link operational mode is 100BASE-T, a PHY will transmit a stream of "idles" in between data packets. In the 100BASE-T case, a PHY must continually transmit the "idles" in order to keep the partner PHY from assuming the link is severed due to no identifiable waveform over a "timeout" period, as well as so that the partner PHY receiver does not loose its "lock" on the timing of the incoming bits. Unlike the slower 10BASE-T mode where there is enough time for the receiving PHY's circuitry to re-align to the timing of received data pulses, in 10BASE-T mode, it is necessary to fill the "quiet" time between data packets with a signal that enables the receiving PHY to remain in synchronization with the data pulses of a received packet. Such synchronization is necessary because at 100Mbps (100BASE-T mode), there is usually not enough time for the receiving PHY's circuitry to re-align to the timing of newly received data pulses immediately following a significant "quiet" period.

For example, for 100BASE-T, the partner PHY receiver must lock onto a 125 Mbps bit stream (4 bits are encoded into 5 bits during transmission). Thus, the partner PHY receiver must distinguish within 8 Nano seconds per pulse bit, whether that bit is a "1" or a "0" (multiple voltage levels or voltage transitions may be used, for example, in this case MLT3 having three voltage levels corresponding to +1, 0, and −1 can be implemented with a transition to the next voltage level representing a "1" and no transition a "0"). In order to make this distinction, PHY receivers typically use a Phase Lock Loop (PLL) to tune to the transmitting PHY's output. The tuned PLL lets the PHY receiver sample the correct points in the received signal to determine if that location or bit in the waveform is a 1 or 0. Further, the receiver PLL is capable of "drifting" or adapting the time at which it takes a sample, with the drifting timing or "phase" of the received waveform characteristics. Thus the PLL is able to sample for 1 or 0 distinctions at optimum waveform locations, even when those locations drift.

The PLL recovers the phase or timing of the incoming clock to determine the timing information of the signal being received. For example, when digital pulses or bits (1's, and 0's) are being received from the media, the PLL is also receiving a timing pulse signal as well. The timing pulse signal lets the PLL know where the next bit will begin, so the PLL can sample the waveform at the proper point to distinguish whether a bit is a 0 or a 1. Thus the PLL knows when to expect the next digital signal bit. For example, the timing signal tells the PLL how many (e.g. 2, 3, or more) blank spots (0's) are in the signal between two high bits (1s).

Additionally, to assist the PLL, most receivers use an equalizer to adjust for the characteristics of the incoming line. Various types of equalizers (e.g. adaptive, fixed, etc.) can be used to balance out the effect the characteristics of the media have on the incoming signal. For example, a twisted pair cable typically experiences an attenuation which is a function of its length and the frequency of interest. The equalizer will compensate for the attenuation by creating a frequency dependant gain. This results in a frequency response that is as flat as possible, across the spectrum, for that cable length. Digital signal processor (DSP) based equalizers often use "coefficients" which are a numeric table of information to map the input characteristics of a link.

d. Power Consumption

In a common network environment, the transmitters and receivers at both ends of the associated network link use a cycle template to enable the exchange of data. The cycle template continues to be exchanged even when the template contains little or no data. This continuous transmittal of the template requires the continual expenditure of transmitter and receiver power.

Power consumption directly influences the cost of operating the device, limits design possibilities, and is of particular importance if the network component is battery driven. For example, if the network device is a lap top computer, the useful operating life of the device is a direct function of battery life.

Additionally, providing support for continuous transmittal of templates for an entire multi-service network requires significant individual network device power, as well as overall network power. Hence, the desire to reduce power consumption in LAN NICs, LAN switch equipment, and other LAN apparatus has resulted in many vendors producing low power PHY devices. However, as will be explained, there is a limit to the amount of power reduction that is possible with today's implementation of physical layer (PHY) devices.

For example, there are several industry schemes and specifications designed to manage or conserve power in a personal computer (PC) environment by powering certain PC components on and off as necessary during PC use. This scheme is generally referred to as Wake-on LAN (WOL), though different vendors may call their particular implementation something different.

For instance Microsoft Wake-on LAN™ and Advanced Micro Device's Magic Packet™ are classic examples of such schemes. Likewise, the most prevalent specifications are Microsoft OnNOW™ (See OnNow Specification (www.microsoft.com)) and the ACPI (See Advanced Configuration and Power Interface Specification (ACPI), Version 1.0b, Feb. 2, 1999 (www.acpi.com)). There is a provision within these industry defacto standards that supports the ability to remotely wake up or put to sleep a networked PC/workstation using specific types of data packets. Thus, using such a scheme it is possible for a PC to enter a suspended mode, or be put to sleep upon receiving a packet over a network.

WOL wake-up and sleep packets are usually generated by a central management station that is responsible for managing all the PC/workstations and network devices in a network. WOL may be used simply to switch machines on or off, or automatically wake them up for software maintenance at night when the machines are not in use. These applications require a NIC to consume very little power, but be capable of waking up as soon as a packet is sent to that NIC over the network. Thus, a WOL capable PC that is connected to a LAN can be "woken up" from a power suspend mode by a wake-up packet received over the network by the PC's PHY, from a partner network device. Use of such technology allows network managers to wake up a sleeping PC update the software and the switch the PC back off.

However, a certain portion of the PC's network device must always stay on to allow the network device to be woken up from a remote location in order to wake the rest of the PC up. Thus, although a lower power states for the overall NIC may be entered in prior systems, in order to allow for Wake-on LAN capability, it is necessary for the PHY part of the NIC to stay fully powered. The fully powered PHY continually transmits and receives signals, so that a channel is kept open for receiving a "wake up" packet from a partner network device.

An example of an early WOL scheme is Magic Packet™ (See Magic Packet Technology White Paper, November 95 (www.amd.com)). Similar to a programmable VCR waking up at a certain time to record a show, Magic Packet allows a PC to be woken up from across a network without re-booting. A Magic Packet is defined as a standard Ethernet MAC frame that contains the address of the target PC NIC that is to be woken up, repeated 16 times within the packet itself. These 16 instances of the station's IEEE MAC address are preceded by 6 bytes of FF. The destination address field within the MAC frame can be either the address of the individual station to be woken up or a multicast/broadcast address i.e. an address that will be received by the PC's MAC controller device.

For example, Magic Packet gives the following example of a data sequence within a Magic Packet for a station with IEEE address '112233445566' as:

DA, SA, <misc>, FF, FF, FF, FF, FF, FF, 11, 22, 33, 44, 55, 66, 11, 22, 33, 44, 55, 66, <plus 14 times 11, 22, 33, 44, 55, 66>, <misc>, CRC.

In another example, the OnNow WOL scheme utilizes a more comprehensive packet-filtering scheme to detect certain types and protocols carried within a frame. There are three basic types of wake up mechanisms defined in the OnNow specification:

Wake up on link status change

Wake up on Magic Packet

Wake up on match against a predefined byte-frame mask stored within the MAC device When in a suspend or sleep mode, the majority of the PC/workstation components are put to sleep, including the main CPU and any network software device drivers that may be interfacing to the LAN adapter. Hence, a WOL capable network device must be capable of looking at a packet and deciding if it is the correct one to wake up the PC/workstation while the rest of the machine is asleep. If the packet content is a correct match, then the adapter will produce an interrupt, which invokes the power management software. This in turn will decide if the PC/workstation is to be fully woken up, woken up just to deal with this one request with a low level device driver, or simply ignored.

In current network devices, in order to receive a wake up packet or other signal it is necessary for PHYs to stay fully powered constantly transmitting on the link between two network devices. As a result, a lower power constant idle state has been developed having Idle Symbols or Pulses that are a specific pattern of low level symbols. Thus, transmission of a continuous waveform can be accomplished in order to hold the link between two PHYs by interlacing data packets with a constant transmission of such low power idles pulses when data transmission is suspended. Nevertheless, the constant idle pulse state requires the PHY transmitter to be fully powered and the PHY is a significant contributor to the power consumption of network devices, adapters, hubs, and switches.

For example, referring to FIG. 5, in prior systems, a PHY must transmit continuous normal idles 512 when data packets 502s are not transmitted so that a continuous idle periods and data packet transmissions 510 waveform having stable data is sent, in order to keep a partner PHY receiver locked into the signal that the first PHY is sending. If the partner PHY receiver fails to detect normal link idles, or data bits for a specified period, the receiver will assume that the link has been broken and the partner PHY will reset. For example, referring to FIG. 3, a Fast Ethernet 100BASE-TX partner PHY assuming the link is broken will set its Link OK flag to "not", enter the no-connect mode, and then begin auto-renegotiation by sending FLPs across the link to determine if it can adequately re-connect to the first PHY. Thus, upon receipt of the partner FLPs, the first PHY will return FLPs to link with the partner device. However, if a data packet is transmitted to either PHY prior to completion of the auto re-negotiation, the data will not be received, but instead will be "lost".

In relation to power management standards, ACPI defines three levels of power down that apply to LAN adapters:

D0—fully operational

D1, D2—various levels of power down (some implementations may support WOL in the D1/2 states)

D3 hot—usually Wake-On LAN state

D3 cold—fully powered down with all functional units non-operational Thus ACPI network devices operate in Network Device Power States D0, D1, D2, and D3.

In the D0 state, the device, including the PHY is fully powered and can freely transmit and receive data and/or idles. In the D1 and D2 or intermediate states, the device is less than fully powered, but requires the PHY to be fully powered in order to constantly transmit idle frames, even though other components of the NIC may be at less than full power. Note that some ACPI implementations support WOL in the D1 or D2 states. D3 has a "D3-hot" and a "D3-cold" state.

In D3-hot, or what prior systems call the Wake-on LAN state, the PHY is still powered up and constantly sending idle frames (symbols) because if the partner PHY fails to receive idles, it may assume that the connection has been broken (dead wire, unplugged wire, etc . . . ) and will reset. To reset, the PHY will go to the reconnect state, and will begin transmitting in full power D0 mode (FLPs for 100BASE-T, or NLPs for 10BASE-T) to determine if the link has been physically broken, or if there was some other error. While in D3-hot, because the PHY is transmitting and receiving, the NIC may be forced back to D0 status by the partner PHY sending a re-initialization "wake up" packet.

In D3-cold the PHY may be powered down, but its receiver can not then receive a "wake up" packet. Thus, the PHY is not able to be woken up in D3-cold, and hence the PHY, NIC, PC, or workstation must be re-initialized or reset locally.

Various power requirements need to be met in the D3 states. For example, in Cardbus NIC applications, the D3-hot state requires no more than 200 mA to be drawn in total by the card in the Wake-up state, whereas the D3 cold requires no more than 5 mA. The challenge to the systems designers is that typical Fast Ethernet PHY devices today can draw more than 100–150 mA when configured in WOL mode, and therefore may exceed the 200 mA limitations. This is especially so for multi-function cards, such as LAN and Modem NICs where there are several potentially high powered devices utilized.

Much of the power consumed by a PHY goes to the transmitter as it must be capable of driving up to 100-meters of category-5 cable and maintain IEEE compliance. Moreover, PHYs are usually over-designed to operate higher power to compensate for poor line conditions.

Consequently, as shown above, most point-to-point LAN links that exist today have no method or capacity to shut off their transmitter power between valid data transmissions or during a sleep or suspended state. For example, switching off a PHY's transmitter altogether would result in the remote partner PHY detecting a loss of link due to the lack of a transmitted signal, NLP, or scrambled idle stream being received by its receiver. As a result, the constant idle pulse state requires the PHY transmitter to be fully powered and the PHY is a significant contributor to the power consumption of network devices, adapters, hubs, and switches.

Fast Ethernet PHYs have already been designed for low voltage and/or low power operation. The overall power consumption of the PHY is reduced by reducing the operational power consumption by using lower voltages. However, there is a physical limit to the amount of power reductions that can be made to the PHY without losing IEEE compliance or compromising reliability.

In the case of standard Fast Ethernet PHY devices, when a NIC is the WOL mode, the PHY has to remain functioning at its full typical idling power even when little or no data is being transmitted or it will loose the link. Hence, a PHY capable of turning its transmitter off during quiet periods would save significant power.

In addition, there is no current method of notifying a remote network node via a simple PHY signaling scheme of the type of schemes a network node supports or requires when waking from a sleep or suspend state.

SUMMARY OF THE INVENTION

The invention provides a method and apparatus for supporting a link-suspend operation between network nodes. It applies to point-to-point data communications links.

Accordingly, it is an object of an embodiment of the invention to provide a network having a full power operational mode for supporting full high-bandwidth communication, and a low power "link-suspend" operational mode for temporary operation when only limited communication is occurring, such as when there are fewer data packets being transmitted across the link. The low power "link-suspend" (LS) mode is designed to reduce the power required by a LAN communications link at the physical layer by occasionally transmitting "link-suspend-pulses" (LSPs) instead of continuous idle pulses or symbols. For example, in LS mode, the invention maintains a digital communications link without causing the link to reset, while cycling transmitter power on and off, during a non-data transmission period, between valid data transmissions or LSP transmissions with a duty cycle that substantially reduces physical layer device (PHY) power.

One embodiment supports negotiation with a remote link partner to set up LS mode by advertising operational mode capabilities between the two network devices. For example, negotiation allows a PHY to easily detect whether it is connected to another LS mode capable PHY through negotiation parameters in order to initiate and monitor LS mode communications.

One aspect of the invention, in accordance with an embodiment, provides a LS mode capable of transmitting and receiving valid data frames when network nodes are in LS, sleep, WOL, or suspend mode. Thus, the invention is able to return to a full communications state, from a sleep or suspend state without missing any incoming data.

Also, an embodiment provides a LS mode capable of monitoring received signals in order to identify LSPs, low power state messages, normal idles, data frames, and incoming WOL packets without causing the link to reset.

Similarly, an embodiment allows a partner network device to detect whether it is linked to a suspended Wake-on LAN (WOL) network device, thus allowing the partner device to enter the LS lower power mode of operation for that link. For example, the invention also provides a means that a switch or hub PHY may easily detect whether it is connected to a suspended Wake-On LAN (WOL) adapter in a PC, thus allowing the switch or hub to enter a LS mode or filter out unwanted packets on the port connected to the suspended PC.

An embodiment of the present invention also contemplates a network node having a method of notifying a remote second partner network node via a simple PHY signaling scheme of the type of "wake-up" schemes the first network node supports or requires when waking from a sleep or suspend state.

Accordingly, when communication between a node and a hub on the network is limited, such as when a network nodes are either idle or have entered a sleep or suspended mode, such as a Wake-on LAN (WOL) state, power can be saved by switching from the normal, full power, multi-service protocol to a low power link suspend protocol. Here, both PHYs at each end of the link can switch off their transmitters for significant periods of time while maintaining a valid link, thus reducing the power consumption of each PHY. By choosing a duty cycle such that the transmitter is off for significant periods of time, it can be shown that the average power consumption can be reduced dramatically in between data transmissions to as much as approximately 30% of the power consumption of today's lowest power PHYs, depending on the implementation.

In addition, in an embodiment, the invention is designed in such a way that it fully inter-operates with prior devices when the new invented features are disabled and will only use the additional features from this invention with another device with similar capabilities.

BRIEF DESCRIPTION OF THE DRAWINGS

FIG. 1 is a block diagram of a typical prior LAN system showing key functional components.

FIG. 2 is a block diagram of a typical prior physical layer device (PHY) system showing key functional components.

FIG. 3 is a state diagram of a half duplex example of the high level operational states of a modified Link Suspend capable PHY, in accordance with an embodiment of the invention.

FIG. 4 is a diagram of possible operational states while in Link Suspend mode or protocol, in accordance with an embodiment of the invention.

FIG. 5 is a waveform diagram showing packet transmissions and idle periods; normal idle transmission; Link Suspend Pulses (LSPs) and characteristics; and normal idle versus LSP power consumption; in accordance with an embodiment of the invention.

FIG. 6 is a register bit map of a LS modified Media Independent Interface (MII) link suspend control and status registers showing Link Suspend parameters, in accordance with an embodiment of the invention.

FIG. 7 is a register bit map of an auto-negotiation Next Page message and example Link Suspend Next Page code words, in accordance with an embodiment of the invention.

FIG. 8 is a general block diagram of a modified Link Suspend capable PHY network device for providing low power Link Suspend negotiation, mode, and pulses, showing key functional components, in accordance with an embodiment of the invention.

FIG. 9 is a graph of average PHY power consumption versus the density of packets being transmitted at any one time on a network link, in accordance with an embodiment of the invention.

FIG. 10 is a waveform diagram of link negotiation pulses showing NLPs and FLPs, in accordance with an embodiment of the invention.

DETAILED DESCRIPTION OF THE INVENTION

The present invention is a method and apparatus for supporting a physical layer link-suspend operation between network nodes. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention. Hereinafter, the term "system" is used to refer to a device and/or a method for performing a function. Also, hereinafter the term "network device", "network node", "physical layer device" or "PHY" is used to refer to a network apparatus, network device, network interface card (NIC), network node, network hub, a computer linked to a network via a network interface card (NIC), voice over Internet Protocol systems, LAN telephone systems, or refers to other devices that perform Internet or network communications specialized functions such as repeaters, bridges, switches, routers, brouters, or any other point to point computer communications element or portion thereof. Furthermore, the PHY function discussed comprises implementation by various appropriate integrated circuit techniques such as by using a predominantly analog circuit approach or a digital signal processor DSP based approach.

One embodiment of the invention generally applies to computer point to point data communications links that normally use constant idle bit streams between packet transmissions. Similarly, an embodiment may also apply to the situation where LAN nodes are either idle (i.e. no packets are being transmitted) or they have entered a sleep or suspended mode of operation, such as in a wake-on LAN state. For example, the invention may reduce power on a LAN communications link at the physical layer by providing a low power operational mode for temporary operation to reduce power consumed by a physical layer device (PHY). To substantially reduce PHY power, the low power mode will cycle transmitter power on and off in a power saving duty cycle when only limited communication is occurring. Here, power is saved by switching from the normal, full power, multi-service protocol to a low power link suspend (LS) protocol where lower power link suspend pulses (LSPs) are occasionally transmitted instead of continuous idle streams. Hereinafter, the terms "protocol" and the term "mode" shall be used to refer to a method, language, mode, protocol, or system of communication.

In one embodiment, the invention is for a Fast Ethernet physical layer device (PHY) in the 100BASE-TX mode of operation. Here, the invention allows a new generation of lower power Wake-on LAN (WOL) capable adapters and power efficient switch or hub equipment to be manufactured that save substantial power over prior generations.

The Link Suspend concept is expandable to other similar Local Area Network standards, such as 10BASE-T, 100BASE-T2, 100BASE-T4, 1000BASE-T or X and 802.5 networks (including High Speed Token Ring) where two communicating nodes share a common link.

Moreover, the invention may apply to various other appropriate data communications links, communications systems between two devices, point-to-point data communications links, and signal transmission and reception systems. For example, the invention can be applied to wireless networks, satellite networks, RF networks, or any other system where idle transmission periods are filled with idle non-data carrying transmissions for the purpose of maintaining a valid link. Similarly, Link suspend can also be used with various other appropriate media such as coax cable, fiber optic cable, satellite links, cell links, radio waves, etc.

According to an embodiment, to ensure compatibility with prior PHY devices, link suspend is implemented as enhancements to existing functional blocks within a PHY that normally uses constant idle bit streams between packet transmissions. Yet, the invention may be used with various other appropriate Physical Layers, PHYs, and network devices (see list above) comprising various other appropriate communications networks.

a. Power Savings

In LAN equipment that exist today most high speed point-to-point LAN links have no method of shutting off the transmitter power between valid data transmissions or during a sleep/suspended state without causing the link to reset. Hence, a low power LS mode of operation is described that reduces overall PHY power consumption at both ends of the link when network traffic intensity is reduced or one of the nodes is placed in a sleep mode.

According to an embodiment, two connected communications nodes are able to enter a low power link suspend mode of operation when either one or both nodes temporarily suspend operation during idle transmission periods on the link and can recover to full operation without losing network data. This "link suspend" (LS) state may be in response to a specific request by a host controller wishing to enter a lower power mode of operation and suspend network communications until a specific network packet or event causes the node and host to wake up. In Link Suspend state, two link partners that are both able to implement the scheme send Link Suspend Pulses (LSPs) back and forth in a complimentary fashion in order to keep the link operational between normal data packet transmissions.

According to one embodiment, one, or both, of the link PHY partners of a 10/100 Fast Ethernet PHY device in link suspend state, will cease continuous transmission of scrambled Idle symbols in 100BASE-TX mode and instead transmit a periodic Link Suspend Pulse (LSP) that requires lower power. For 10BASE-T mode, the PHY partners may optionally cease transmitting NLPs and instead transmit LSPs based on an alternative NLP pulse shape or period that requires less power.

Thus, a benefit of the Link Suspend state is lower consumption of power by devices during the Idle state. Since the ratio of the short time when the transmitter is on versus off while in the new invented mode causes a significant reduction in the power consumption of a physical layer device, the system allows both physical layer devices at each of the link to save power in this manner.

Similarly, LS may also be employed where general power reductions are required during quiet times on the LAN. As more networks migrate to 100 Mbps at the desktop, the savings become more apparent. For instance, if the average power savings are of the order of 90 mA per network device (180 mA per link), then for 3.3V systems, this translates to approx. 300 mW per PHY. For a 1000 PC network, this translates to 300W for the PC NIC PHYs and 300W for the corresponding switch PHY port i.e. 0.6 kW total.

One embodiment vastly reduces power on a systems wide basis and improves implementation of a PC's Advanced Configuration Power management Interface (ACPI) implementation for LAN capable PCs, along with the Microsoft OnNow™ Wake-on LAN™ (WOL) network interface cards within the newer generation of networked personal computers. In addition, the lower power consumption on every link in the network (there can be many 1000s of links) reduces network operational costs and system cooling requirements.

b. Negotiation of LS Mode

According to an embodiment, LS capable network devices may recognize other LS network devices through the use of negotiation during link initialization along with specific signal characteristic that facilitates a fast recovery when data is intended to be transmitted across the link. Hence, a low power LS mode of operation may provide for negotiation or auto-negotiation to advertise low power mode capability allowing a LAN adapter or switch product to add several unique features. In the case of an ACPI/WOL capable NIC, one advantage is much lower power when the WOL scheme is in use. Thus, it is possible to offer an energy efficient or "green" switch that is capable of recognizing link-suspend capable adapters and entering a corresponding per port low power mode of operation, significantly reducing the idle power consumption of the switch.

According to an embodiment, implementing LS in either an ACPI/Wake-On LAN capable adapter or energy efficient switch is straightforward. Enabling link-suspend in the PHY may be performed by writing a logic 1 to the link-suspend enable bit (defaults to off) (see LSEN explanation below). Also, the PHY may support a means of configuring the device via hardware pin selection enabling link-suspend to default to being always enabled following a reset/power on. Similarly, a NIC may always have the mode enabled, relying on the PHY to automatically enter the mode based on the auto-negotiation result. Additionally, the mode may be enabled only when the adapter wishes to enter the link-suspend e.g. when the PC is shutting down and entering a sleep state. Hardware selection of link-suspend operation is useful for dumb switch controllers that do not have a programmable engine or CPU attached to enable or configure link-suspend via software.

In local area networking equipment that exist today there is no means by which a switch or hub PHY may easily detect whether it is connected to a suspended Wake-on LAN adapter in a PC, thus allowing it to enter a lower power mode of operation for that port. Thus an additional benefit, according to an embodiment, solves the prior difficulty by providing a simple PHY signaling scheme of notifying a remote network node of the type of schemes a network node supports or requires when waking from a sleep or suspend state, such that the remote node may behave accordingly.

Likewise, a third benefit, according to an embodiment, is that link suspend is defined to be a state which was agreed to during negotiation and is thus not lost, but merely suspended when exited from. Thus, exiting from and re-entering into the LS state does not require the two link partners to re-negotiate a link. For example, when a network device exits the LS state, it may re-enter the previous link state (e.g. IEEE 802.3 normal mode with continuous idle transmission) without resetting to a no-connect state or re-negotiating.

FIG. 3 is a state diagram of a half duplex example of the high level operational states of a link suspend PHY, in accordance with an embodiment of the invention. FIG. 3 shows the high level operational modes of an auto-negotiating PHY incorporating the invention. Note, the case where auto-negotiation 310 is not enabled is not shown to simplify the discussion. Following a reset or initial power on, a standard PHY will enter the "No Connect" state 300. It will then proceed to auto-negotiate 310 with the partner PHY with the purpose of establishing the capabilities of the partner PHY and also advertising it's own capabilities to the partner PHY. Typical capabilities exchanged during auto-negotiation in prior PHYs are link speed, type of signaling, encoding schemes, and full or half duplex capability.

The Link OK flag 342, in accordance with standard IEEE 802.3 Ethernet modes of operation, indicates when the link is operating properly or is fit. If error rates become unacceptable because a PHY receiver missed too many pulses or received too much noise; or upon a partner PHY becoming unstable; a cable being pulled out; or other appropriate media or receiver detected failures; then the Link OK flag will be set to the "not" state and the link will be declared unfit. When a link is lost, and the Link OK flag is not active, a PHY will reset and attempt to re-establish that link by entering the no-connect state 300 and trying to re-negotiate on that link. For example, a Fast Ethernet 100BASE-TX PHY with its Link OK flag reset will enter the no-connect mode, and then begin auto-renegotiation across the link by sending FLPs to see if another device is on the link. However, in some PHYs, if a data packet is transmitted to the partner PHY during the re-negotiation, the data will not be received, but instead will be "lost".

An embodiment of this invention includes the added ability within the auto-negotiation process 310 to exchange capabilities and parameters associated with link-suspend. Thus, when two link-suspend capable PHYs are first connected or powered on, in addition to the other typical negotiation parameters, the PHY's may exchange parameters with each other to determine if they can support link-suspend. For example, unused bits in the baseline auto-negotiation or Next Page extensions, as described in the IEEE 802.3 standard, may be used to auto-negotiate link suspend mode as well.

Referring to an embodiment, as shown in FIG. 3, a link suspend capable PHY may control its ability to advertise support for link-suspend via the control bit, link-suspend available (LSAV) 302, controlled by a higher level device via the MAC. A link partner's ability to support link-suspend mode, determined during the auto negotiation process, is indicated by the link-partner link-suspend available (LPLSAV) bit (note that the "LP" prefix indicates a link partner flag). A PHY may only enable link-suspend if both of these flags are active. Auto-negotiation of Link Suspend mode will be discussed further below.

According to an embodiment of the invention, a PHY enables and disables LS mode or operation via a link-suspend enable bit (LSEN) 332. Link-suspend operation may then be enabled once the link-suspend enable (LSEN) bit is set. Setting LSEN, 332, inactive causes the device to leave link-suspend mode and re-enter IEEE 802.3 standard operating mode, as illustrated in FIG. 3.

Embodiments of the invention include various systems for negotiating link suspend mode. In one embodiment full auto-negotiation based on a Next Page scheme is used. In another, transparent negotiation using a low level signaling scheme is employed. Additional embodiments comprise combinations of schemes, such as, for example, combining a version of full Next Page auto-negotiation with a transparent negotiation backup.

According to an embodiment of the present invention, link suspend capability may be negotiated through use of full auto-negotiation based on Next Page capability. Next Page auto-negotiation may be enabled when the link suspend auto-negotiate (LSAN) control bit is set. For instance, following a reset, if LSAN is set, then the PHY will support the Next Page link suspend auto-negotiation scheme. Note that LSAN defaults to off (zero) following a power on reset, but is not affected by a soft reset to support this mode of operation. In addition, embodiments may incorporate hardware control pins to allow the default value of LSAN to be set to facilitate applications that do not wish to use software to change the LSAN setting (e.g. multi-port PHYs in switch applications).

For example, in an embodiment, unused bits in the baseline auto-negotiation or Next Page extensions, as described in the IEEE 802.3 standard, may be used to auto-negotiate link suspend mode. For instance, after a Fast Ethernet PHY transmits an FLP, if there is a return pulse, the PHY will then pass information identifying what type of PHY it is and what modes it is capable of supporting. Referring to the embodiment illustrated in FIG. 3, the PHY would send capability to support Fast Ethernet communications in Normal 802.3 Mode (including Idle mode), and Link Suspend Mode (including Link Suspend idle mode). Next page auto detection of link suspend will be explained further below.

c. Transparent Negotiation of Link Suspend Mode

Additionally, according to an embodiment of the present invention, link suspend capability may be negotiated through transparent auto-detect via low level signaling. Transparent auto-detect is simple to implement and offers a basic indication to a remote PHY that a first PHY is capable of link-suspend. Low level signaling (compatible with the existing Ethernet standards) from the first PHY takes place following a PHY reset or power on. This scheme provides a simple method for advertising link suspend ability without the need for modification to the current auto-negotiation standards as discussed for full auto-negotiation of link suspend mode above.

For an embodiment having an auto-negotiation system using both a Next Page scheme and a transparent scheme, transparent mode may still be active during Next Page auto-negotiation mode, however, any common parameters setup as a result of the transparent negotiation may be over-ridden by those exchanged during the Next Page auto-negotiation mode. In one such example, transparent auto-detection of link suspend is enabled when the link suspend auto-negotiate (LSAN) control bit is false (default) and auto-negotiation Next Page is also disabled (see below). In this mode, a LS capable PHY will employ a simple transparent signaling method embedded within the standard FLP or 10BASE-T templates to signal link-suspend ability to a remote partner. This process will only occur if the link-suspend available (LSAV) control bit in the LS capable PHY is set. Upon recognizing the embedded LSAV signal from a partner PHY, the LS capable PHY will set its own link partner link-suspend available (LPLSAV) bit in order to allow for entry into LS mode.

Link-suspend operation is then enabled once the link-suspend enable (LSEN) bit is set, indicating that the higher layer device wishes to enter the link-suspend mode. Setting LSEN inactive causes the device to leave link-suspend mode and re-enter IEEE 802.3 standard operating mode as illustrated in FIG. 3.

The benefit of the low level detect mode is that it can work within the framework of the existing IEEE 802.3 auto-negotiation standards without the need for changes to the standard. For example, the low level detect method for certain existing series of Fast Ethernet PHY devices and cores will inter-operate fully with existing legacy PHYs in the market place today. Thus, systems using current auto-negotiation standards may comprise LS capable devices that will recognize another LS PHY device as the remote PHY and enable the link-suspend capability. Furthermore, in an embodiment, the LSAV AND LPLSAV flags are used internally by the PHY and are also made available to the MAC or Switch.

Although auto-negotiation according to one embodiment is illustrated in FIG. 3, other appropriate methods and/or devices for allowing network devices to communicate in link suspend mode may also be used. For example, a hardware configuration that causes connected PHYs that are LS mode capable to automatically try link suspend mode after the no connect mode, by sending a link suspend pulse and listening for a return link suspend pulse in order to identify partner LS capability may be used. Similarly, although according to the embodiment of FIG. 3, negotiation of LS capability is done during initial link negotiation or after no-connect state, negotiation, identification, or entry of LS mode may also be performed at various other appropriate times. In addition, an embodiment of the invention provides for backwards compatibility, so that the LS PHY can interface with non LS PHY's.

d. Link Suspend Mode

According to an embodiment, after negotiation of LS mode capability, a LS PHY or device has two options or modes of operation. The LS PHY may enter a Normal mode (e.g. mode of prior devices), or may enter LS mode. For example, a PC NIC, 100 Mb Fast Ethernet mode (100BASE-T), may enter Normal IEEE 802.3 mode having its PHY is fully powered, and continually transmitting and receiving normal Idles and data. Alternatively, the PC NIC may enter a low power LS mode.

Referring to FIG. 3, an embodiment comprises a no connect state 300, an auto-negotiation state 310, a Normal IEEE 802.3 Mode 320, and a Link Suspend Mode 330. In turn, the Normal IEEE 802.3 Mode 320, has a standard idle state 318, a receive data frames state 322, and a transmit data frames state 324. The Link Suspend Mode 330, has a Link Suspend Idle state 338, a receive data frames state 336, and a transmit data frames state 334.

Thus, as shown in FIG. 3, once the auto-negotiation process 310 is complete, the PHY may enter a standard idle state 318 that is part of a normal operating mode of an IEEE 802.3 PHY 320. While in standard idle 318, the PHY receives standard idles and/or transmits standard idles as per the IEEE 802.3 standard. In full duplex mode, both receive and transmit of standard Idles can occur simultaneously. Alternatively, data frames are transmitted in the transmit data frames state 324, and data frames are received in the receive data frames state 322.

The invention modifies the standard PHY's modes by adding a further mode of operation, called Link-Suspend (LS) mode 330. LS mode is enabled provided that a control signal, link-suspend enable (LSEN) 332, is active, in addition to LSAV 302 and LPLSAV 304 being active as discussed earlier. The LSEN 332 may be implemented as a control register bit that is set either by a higher layer device, or configured using other means such as hardware mode configuration pins on the PHY device. Also, LSEN may default following a reset or power on of the PHY to either active or inactive, depending on the preference of the higher layer devices or hardware pins.

In an embodiment, LS mode has a Link Suspend Idle state 338 where Link Suspend Pulses (LSP) are transmitted, a receive data frames state 336 where normal data frames can be received, and a transmit data frames state 334 where normal data frames can be transmitted. In the LS Idle state 338, the LS network device is able to instantly transition to the second receive/transmit data state in order to send or receive data frames, while still staying in LS mode. The LS network device is also capable of returning from the receive data frames state 336 or transmit data frames state 334, to the Link Suspend Idle state 338, while staying in LS mode. Further, the device can switch between the receive data frames state 336 and transmit data frames state 334, without returning to the LS idle state. Thus, while in LS mode, the PHY may be able to send and receive LSPs and data frames; as well as be able to accept that the partner PHY may not continually send frames or idle symbols in return.

For example, when in the LS idle state 338, standard 100BASE-TX scrambled idle symbol transmissions on the media are replaced with link suspend pulses (LSPs) designed to reduce PHY power consumption to a minimum level between data packets and during link idle times. In addition, the LSPs are used to indicate to each remote PHY partner that there is still an active PHY link. Thus, LSPs received by a partner LS PHY will prevent the partner LS PHY from entering the no-connect state 300 or attempting to re-auto-negotiate 310 the link.

Moreover, when in the link suspend mode 330, normal data frames may be received 336 or transmitted 334 in half or full duplex with the difference from normal 802.3 mode being that the PHY returns to LS idle state 338, instead of the standard idle state 318, when data is not being received or transmitted.

Additionally, embodiments allow LS mode to be applied as permanent operating mode, or in conjunction with various other network device modes, as appropriate. For example, LS mode may be entered, not just during D3 or WOL power states, but also to reduce power consumption during intermediate low power modes such as D1 or D2.

Prior PHYs send constant idles pulses or symbols to a partner PHY when data communications are attenuated, when in any D0–D3 state, or when in any WOL state, in order to tell the partner not to drop the link just because no data is being received. Similarly, in an embodiment, a LS network device must be able to "hold" the link by using occasional LSPs comprising data, idle pulses, or idle symbols, as will be further explained below. However, various other appropriate systems for holding the link between LS network devices may also be used.

In an embodiment, in order to detect a removed cable, unplugged cable, broken cable, non-functional partner PHY, or powered-off partner PHY, an LSP receive timer may be implemented that detects if LSPs are being received. If no LSPs are received from the partner PHY within the period defined by the parameter LSPExp (LSP Expiration), the link is assumed to be broken. When the link is assumed broken, the PHY will fall back to the no connect state 300, as shown in FIG. 3. Furthermore, the internal flag, LSP received ok (LSPRXOK) 340 is active while LSPs are received and the timer has not timed out, and set false when no LSPs are received for a period exceeding the allowed time set by LSPExp (i.e. timer has timed out).

For instance, the timer-reload value, referred to as LSPExp, may default to 2× the value of the current LSP-Period value. In addition, LSPExp may be reset to an alternative value if appropriate based on multiples of LSP-Period or turned off for diagnostic purposes. The value of LSPExp may be advertised during auto-negotiation to a link partner using the Link-suspend Code Word.

According to one embodiment of the invention, the general rules followed by a LS PHY and a partner LS PHY may be summarized as follows:

1. A LS PHY enters the link-suspend mode 330 when both itself and a partner LS PHY have indicated via auto-negotiation 310 that they both support link-suspend mode (LSAV*LPLSAV is true) AND link-suspend mode has been enabled (LSEN=1).
2. A LS PHY remains in link-suspend mode 330, receiving and transmitting LSPs or valid data frames, under the following conditions:
    a. Valid LSPs are received from the link partner LS PHY such that the LSP receive timer (loaded with the LSPExp value every time a valid LSP is received) does not expire;
    b. Valid data frames are received in the same format as those prior to entering link-suspend mode; and
    c. Valid data frames are presented to the LS PHY at the LS modified MII transmit interface for transmitting onto the media.
3. A LS PHY exits link-suspend mode 330 and resets to the no connect state 300, under the following conditions:
    a. No LSPs or data frame activities are detected or received for a timeout period of time, indicating a cable has been unplugged or the remote link partner is non functional or has been switched off (LSPRXOK flag is reset). This timeout value is set by the LSP expiration parameter (LSPExp) within a LS PHY; or
    b. Normal data frame link pulses are detected or received by the LS PHY, indicating that the link partner LS PHY wishes to restart the auto-negotiation 310 process or go to the no connect state 300.
4. A LS PHY exits the link-suspend mode 330 and resumes its prior operational state (for example normal IEEE 802.3 mode, 320) without resetting (e.g. returning to the no connect state 300) or causing a re-auto-negotiation 310 of the link when LSEN 332 is set inactive by the LS PHY's associated software device driver or MAC.

5. While in the link-suspend mode 330, a LS PHY may:
   a. Transmit LSPs during periods when the link would normally be idle (e.g. during link suspend idle state 338);
   b. Receive LSPs, or normal scrambled idle stream (continuous idles) depending on the setting of the LSPMode bit (see below) (e.g. during link suspend idle state 338);
   c. Have sufficient minimal receive circuitry powered up to receive, recognize, and pass valid data frame messages or activity to the LS modified receive interface (e.g. during receive data frames state 336); or
   d. Permit data to be transmitted without delay, from the LS modified transmit interface, onto the media (e.g. during transmit data frames state 334).

Furthermore, referring to FIG. 3, according to one embodiment, if both PHYs are link-suspend capable (i.e. LSAV 302, and LPLSAV 304 are both true) but a LS PHY is in the normal IEEE 802.3 mode 320, because LSEN 332 is inactive, that PHY must continue to receive LSPs without causing the link to reset (e.g. enter the no connect state 300). Under such circumstance, that PHY will remain in the standard idle mode 318, transmitting standard scrambled idles (e.g. 100BASE-TX), but receiving LSPs. Thus, the receive state machine 206, may be modified from the current IEEE 802.3 standard so that that PHY does not cause the link to reset back to the no-connect state 300. Here, the default power-on state of the PHYs may be with LSAV 302 set and LSEN 332 reset.

According to one embodiment, a LS PHY (say a Switch PHY) may be configured such that it enters link-suspend mode 330, from the standard 802.3 mode 320, only when that PHY receives LSPs (dependant on LSEN 332 being set by that switch PHY so that the partner LS PHY knows that the switch PHY is link suspend mode 330 capable). In this case, the Switch PHY would have to ensure that it can be forced into the link-suspend idle state 338, as indication that LSPs are transmitted by the far end. Thus, the switch PHY going into link suspend mode is verification that the partner PHY is sending LSPs and they are being received by the Switch PHY. Here, whenever the Switch PHY is in link suspend mode, it is assumed that LSPs are being sent by both PHYs.

Such operation allows one of the PHYs (the Switch PHY here) to have control over whether the entire link (i.e. both PHYs) enters or exits link suspend mode. Here, the Switch PHY sends LSEN 332, enabling the partner PHY to send LSPs in LS mode, thus causing the Switch PHY to enter LS mode and send LSPs based on detection of the partner's LSPs.

FIG. 4 is a diagram of possible operational states while in link suspend mode or protocol, in accordance with an embodiment of the invention. It shows the various operational states that a LS capable Switch PHY 418 and a LS capable NIC PHY 424 can be in while both enabled in the link-suspend mode 330.

(a) When both PHYs are in LS idle state 402, each PHY is periodically transmitting LSPs. Thus, both PHYs (Switch 418 and NIC 424) are saving power.

(b) When the Switch PHY is transmitting a data frame with the NIC PHY in LS idle state 404, each PHY is still in LS mode. Thus, the LS capable Switch PHY 418 draws higher power while transmitting one or more data frames (e.g. wake-up frames), reducing power between data frames, with its transmitter periodically transmitting LSPs and not continually transmitting standard idles. Moreover, the LS capable NIC PHY 424 is saving power because it is only periodically transmitting LSPs.

(c) When the NIC PHY is transmitting a data frame with the Switch PHY in LS idle state 406, each PHY is still in LS mode. The Switch-PHY 418 has finished transmitting a data frame and the NIC PHY 424 is transmitting a data frame back to the receiving switch. Thus, the LS capable NIC PHY 424 draws higher power while transmitting while transmitting the one or more return data frames (e.g. wake-up confirmed frames), reducing power consumption between data frames with its transmitter periodically transmitting LSPs and not continually transmitting standard idles. Moreover, the LS capable Switch PHY 418 is saving power because it is only periodically transmitting LSPs.

(d) When the NIC PHY and Switch PHY are both transmitting (full duplex) data frames while in LS mode 408, each PHY is still in LS mode. Data transmission is in a full duplex mode with each PHY receiving and transmitting simultaneously, as they would normally, with the exception that between data frames, instead of continually transmitting standard idles, each PHY is periodically transmitting LSPs. Thus, the LS capable NIC PHY 424 and Switch PHY 418 draw higher power while transmitting the data frames, and reduced power then the PHYs' transmitters are periodically transmitting LSPs as opposed to not continually transmitting standard idles. Overall power is reduced depending on the density of data frames as illustrated in FIG. 9. Note, there are cases discussed later where a PHY may not be able to receive LSPs (See LSP transmit only mode below.)

e. Link Suspend Pulses

In prior systems, in order to allow for any future communications, it is necessary for a PHY to stay fully powered, continually transmitting data frames interlaced with idle symbols or pulses. These idle pulses typically contain a specific pattern of low level symbols, that require less power to transmit across the media or wire, but are enough to keep the receiver of a partner PHY locked on. Hence in link suspend mode it is still necessary to keep some type of link relationship between the PHY transmitter and the partner PHY receiver. The relationship is maintained by Link Suspend Pulses (LSPs) that cause the partner PHY receiver into holding onto the link, so that the partner is capable of sending return LSPs, normal idle pulses, data frames, or a WOL or a "D3-hot" state PHY a wake up packet. Thus, LSPs are sent periodically to keep the link ready and in "standby" state for further communication, and to keep the link from resetting (e.g. resetting before receiving a data packet).

FIG. 9 is a graph of average PHY power consumption versus the density of packets being transmitted at any one time on a network link, in accordance with an embodiment of the invention. The graph is a power curve 900, showing the average PHY power consumed, 902, increasing with increasing packet density, 904. The power curve is at its lowest or minimum PHY power consumption, 908, (e.g. 50 mW), when no packets are being transmitted. At the opposite extreme, during continuous packet transmission, the power curve reaches the saturation point of normal typical average PHY power consumption, 902, (e.g. 250–300 mW).

FIG. 5 is a waveform diagram showing packet transmissions and idle periods; normal idle transmission; Link Suspend Pulses (LSPs) and characteristics; and normal idle versus LSP power consumption; in accordance with an embodiment of the invention. The first waveform of FIG. 5 shows continuous idle periods and data packets transmissions 510, having Idle Periods 500 interspersed between data Packet Transmissions 502 during normal network interface communications. The second waveform shows continuous normal idles 512 of a non-LS prior idle state where normal idles 520 are continuously transmitted to keep a partner receiver "locked on". The third waveform shows Idle Periods 500 comprising periodic Link Suspend Pulses (LSPs) 513, as opposed to the continuous normal idles 512 of a non-LS prior idle state. The LSPs 530, occur at a LSP period (e.g. LSPPeriod) and occur for a LSP width (e.g. LSPWidth 534). The fourth waveform shows periodic LSP power consumption 514.

Referring to FIG.5, as described earlier, link-suspend pulses (LSPs) 530, are used to replace standard idles 520 or normal idle transmissions, while in the link-suspend mode 330. The purpose of the LSPs 530 is to indicate the presence of a valid link and remote link partner as an alternative to the standard scrambled idle stream 520, while conserving power within the PHY device and on the physical media.

FIG. 5 shows the effect of using LSPs 530, as compared to transmission of continuous standard idles 520 in standard idle mode, on the consumption of transmitter power and corresponding PHY power. By plotting normal idles with the LSPs the periodic LSP power consumption 514 is illustrated. Here, the average link suspend power consumed by the PHY during the link suspend idle state (e.g. LSAvPwr 540) can be calculated by comparing the typical power consumption of a PHY during normal idle state (e.g. TypPwr 542), and the minimal power consumption of a PHY between link suspend idle pulses (e.g. MinPwr 544 during LSP Period 532, less LSP Width 534). Hence, using the definitions for LSAvPwr, TypPwr, MinPwr, LSPWidth, and LSPPeriod given thus far, the power consumption for the LSP steady state condition 338 is described by the following equation:

$$LSAvPwr=((TypPwr)*(LSPWidth/LSPPeriod))+\\ ((MinPwr)*((LSPPeriod-LSPWidth)/LSPPeriod))$$

Using the values for the LSPWidth 534 and LSPPeriod 532 from the equation given above, LSAvPwr can be calculated as follows:

$$LSAvPwr=((TypPwr)*(0.96/51200))+((MinPwr)*((51200-0.96)/51200))$$

$$LSAvPwr=((TypPwr)*(0.00002))+((MinPwr)*(0.99998))$$

$$LSAvPwr\sim MinPwr$$

Thus, LSAvPwr is roughly equal to the MinPwr consumption of the PHY when its transmitter is turned off. For example, a typical PHY consumes roughly 330 mW during standard idle 320. During link suspend idle 330, from present estimates, the PHY could consume as little as 50–70 mW, i.e. an 80–85% reduction in power.

According to one embodiment, in 10BASE-T mode, a special link-suspend pulse may not be required if the PHY has been designed to reduce its power between normal link pulses (NLPs). The argument is similar to the above case for 100BASE-TX link suspend, where the average power consumption of the PHY when transmitting NLPs can be designed to be close to the equivalent MinPwr for 10BASE-T, the power consumed in-between the pulse.

Moreover, for network devices having numerous LS capable PHYs, such as a switch for example, the power savings will be multiplied by the number of LS PHYs linked to other partner LS capable PHYs. Thus, for a switch having multiple LS PHYs interfaced to multiple other LS network devices (NICs for example, each having only a single PHY), the NICs and the switch benefit in an 80–85% power savings for each PHY-PHY link which enjoys the low power LS mode.

f. LSP Composition

Moreover, in an embodiment, an LSP indicates the presence of a link partner in link suspend mode to facilitate a lower power mode of operation for either one or both link partner PHYs. The frequency of an LSP can be set to any specific value that can be designed into a PHY. The frequency is allowed to be fixed or programmable. LSPs may be sent uni-directionally or bi-directionally between a PHY and its link partner. Specific implementations might require LSPs, for example, to be only sent from the PHY on the NIC to the PHY on the switch and not in the other direction. On the other hand, some implementations might require LSPs to be sent from both the NIC's PHY and the switch or hub PHY.

In an embodiment of the invention, LSPs 530 can be implemented a number of ways, from single electrical pulses to bursts of standard idles, and/or specially coded symbols. For example, the LSP may comprise of some of the unused symbols of a particular coding scheme (for example unused symbols in a standard IEEE 802.3 coding scheme) in order to distinguish the LSP from data frames or standard idle patterns, making LSP detection easier. Also, in one embodiment, it may be desirable to replace 10BASE-T mode normal link pulses (NLPs) with LSPs that uses the same pulse type as NLPs but with a longer period.

In an embodiment, for 1000BASE-T, where each of four pairs of signal links employs a duplex transmission approach, four simultaneously transmitted LSPs may be used. Also, an embodiment, may shut down one or more of the four duplex transmissions links during link-suspend idle and use a fewer number of LSP pairs, or even a single pair if possible, to transmit LSPs and assure resynchronization of partner LS network device receivers.

In an embodiment for a 100BASE-TX link, when link-suspend mode is enabled and active, a LS Switch PHY transmitter will start sending LSPs 530 within the timeframe LSPPeriod 532, following the end of transmitting a valid frame 502. LSPs may be made up of a series of scrambled idle symbol bursts, consisting typically of 32 symbols. The number of symbols in an idle burst may be altered via the parameter LSPWidth 534, allowing a range of 32 up to 512 symbols (default 32). The LSPPeriod period parameter may be programmed as multiples of a base value of 512 ms, for example. In this case, LSPPeriod 532 may be equal to "0", causing an LSP pulse to occur every 512 ms, or "3" (e.g. binary 11, as shown in FIG. 7) extending the period to 2048 ms. In addition, the PHY may transmit a normal data frame 502, when TXEN (Transmit Enable) is asserted at the LS modified MII transmit interface, and ceases sending LSPs until the frame is completely transmitted 502. Further embodiments include LSPs having fixed non-programmable LSP Width and LSP Period.

According to an embodiment, a LS capable PHY receiver (e.g. receiver circuits 210, receiver PHY functions component 206, and normal and fast link pulse and valid frame detector 214), when in the link-suspend state and receiving LSPs 530, must be capable of resuming full data operations when a data frame is received. Thus, the PHY must implement an appropriate means of restarting the receiver within the frame pre-amble period without losing any of the received frame data.

For example, according to one embodiment, the PHY may send an LSP comprising of 20 normal idle pulses, and then switch off its transmitter for a period three times as long as it takes to transmit the 20 pulses. Entering such a duty cycle assures that the transmitter is off for most of the time, substantially reducing PHY power consumption, thus saving most of the power expended by the NIC.

According to one embodiment, the type of signaling used by the LSP is such that it facilitates a fast recovery of the receiver upon reception of an LSP or data packet while in LS mode, and maybe used to resynchronize the receiver clock and data recovery circuits while the link is in the link-suspend idle state 330. The LSP should cause resynchronization of the receiver circuits to allow them to recover a LSP or a transmitted data frame from the remote partner PHY within the standard preamble time of the incoming data frame.

For instance, according to an embodiment, LSPs may have characteristics to assure both PHY receivers stay synchronized to each other's transmitter outputs. In other words, each LS network device must assure that it has the capability to remember certain receiver Phase Lock Loop information (e.g. timing cycle) and filter coefficients.

According to an embodiment, in order to distinguish incoming signal bits and type, a PHY's receiver PLL must be able to lock onto the timing of an incoming signal in LS mode, even if the signal is unexpected, or arrives when the transmitting PHY is supposed to have its transmitter powered down. In other words, the receiver PLL must keep the timing rhythm, or be capable of fast locking onto the incoming signal, even without the idle timing pulses. Since typical prior PHY PLLs rely on receiving a continuous signal containing either data frames or idle pulses to hold a lock, these devices do not have capacity to remember timing or signal information during transmitter powered down period of LS mode. Examples of such signal information are link phase, link timing, and PLL phase period (the timing between clock pulses). Hence, such a prior PHY must be adapted to be able to keep timing rhythm in order to estimate where the bits of an incoming signal will be. Then, even 100 clock ticks down the road, the PLL will be able to tune in with received data bits to distinguish 1s and 0s.

Similarly, in an embodiment, an adaptive receiver PHY equalizer is designed to remember the input characteristics of the link, as last determined. For example, storage of the equalizer coefficients, which contain information that maps the input characteristics, will enable the receiver to quickly adapt to the received signal.

However, embodiments comprising various appropriate LSPs may be used to ensure that link suspend capable network devices can recognize, distinguish, and interpret LSPs, standard idles, data frames, wake up packets, or other communications during entry to, departure from, or existence in any communications condition, protocol, or mode. For example, embodiments having various other appropriate systems or electronic signals for receiving and/or transmitting data while in LS mode, or by transitioning to another mode or state, may be used.

g. LS Modified MII Control and Registers

FIG. 6 is an example of a register bit map of a LS modified Media Independent Interface (MII) link suspend control and status registers 600 showing link suspend parameters, in accordance with an embodiment of the invention. The LS modified MII, comprises a link suspend message identification (ID) register 602, link partner status register 604, and link suspend control register 606. Each of the three registers has 16 bits. The bits in the words are identified by a "D", followed by the bit number, beginning with "0", as illustrated in FIG. 6. The link suspend message identification register 602, comprises the Link Suspend Message Identification 630 in bits D0–10, and reserved bits 628 in bits D11–15. The link partner status register 604, comprises reserved bit 628 in bit D0, LPLSAV 304 in bit D1, LPLSPMode 621 in bit D2, reserved bit 628 in bit D3, LPLSPPeriod 618 in bits D4–5, LPLSPExp 616 in bits D6–7, LPLSPWidth 612 in bits D8–11, LPWakeUpCode 626 in bits D12–14, and reserved bit 628 in bit D15 (note that the "LP" prefix indicates a link partner flag). Parameters that are received during auto-negotiation are stored in the link partner status register. For example LSAV, LPLSPExp, LPWakeUpCode, LPLSPWidth and LPLSMode. The link suspend control register 606, comprises LSEN 332 in bit D0, LSAV 302 in bit D1, LSPMode 620 in bit D2, reserved bit 628 in bit D3, LSPPeriod 532 in bits D4–5, LSPExp 614 in bits D6–7, LSPWidth 534 in bits D8–11, WakeUpCode 624 in bits D12–14, and LSAN 622 in bit D15. Reserved bits 628 may support redundant codes or data or perform other valid functions such as providing message protocol or control information as necessary.

In accordance with one embodiment of the invention, during system operation, a PHY in LS mode must ensure that it observes the Link Partner LSPWidth (LPLSPWidth) parameter 612 received and sets its transmitted LSP pulse width, LSPWidth 534, accordingly. The timer-reload value, referred to as LSPExp 614, is set by the received parameters from the remote partner PHY. For instance, the link partner LSPExp (LPLSPExp) 616 and link partner LSPPeriod (LPLSPPeriod) 618 values received by a PHY ensure that the LSP receive timer functions correctly in accordance with the timing of partner PHYs transmitter functions.

In the invention, according to an embodiment, the LSPPeriod and LSPWidth values are advertised to the link partner during auto-negotiation when LSAN is set. For PHYs that implement the transparent detect method described earlier without using the Next Page auto-negotiation, the default LSP parameter values are assumed (indicated in the Link Suspend Code Word earlier). The link partner must ensure that it observes the LSPWidth parameter received and sets its LSP pulse width accordingly. The same applies to the LSPMode parameter. Thus, the remote PHY upon receiving LSPMode must set its LSP transmit mode accordingly.

In an embodiment of the invention, in order to ensure a valid link is still present, each PHY must implement a counter for timing the arrival rate of LSPs 530 when link-suspend mode 330 is active. If the timer expires, the flag LSPRXOK 340 is reset and the PHY will reset back to the no-connect state 300 as shown in FIG. 3. It may be reset to an alternative value if appropriate based on multiples of LSPPeriod 532 or turned off for diagnostic purposes. Both the LSPPeriod 532 and LSPWidth 534 values are advertised during auto-negotiation to a link partner as described later.

h. LSP Transmit Only Mode

In an embodiment, it may be desirable or necessary to only have one of the PHYs generate LSPs 530s, and the other continue in a non-LS transmit mode. For instance, a PHY generating LSPs may wish to receive 100BASE-TX scrambled idles 520s. Consequently, the receive circuits of the PHY receiving the standard idles remain in normal IEEE 802.3 operation and are able to instantly receive a Wake-on Lan (WOL) frame. In order to implement LSP transmit only mode, the LSPMode Control Flag or bit 620 may be used in auto-negotiation Next Page (explained below) to allow a PHY to advertise to its link partner that it requires the link partner to always transmit standard idles 520s as opposed to LSPs 530s. Likewise, the LPLSPMode Control Flag 621, allows the link partner to advertise the same requirement in return, if necessary.

According to an embodiment, transmitting LSPs while requesting normal continuous idle streams can be used by the LS capable NIC PHY 424 communicating with a LS capable Switch PHY 418, so that an incoming WOL packet received by the NIC PHY is not missed in 100BASE-TX transmit due to the receiver circuits (PLL and equalizer) not being able to lock onto the incoming packet and resynchronize the scrambler. Note that lower power consumption is still realized in the LSP transmitting NIC PHY 424, but not in the normal idle transmitting LS capable Switch PHY 418.

For typical WOL applications, it is not expected that the LS Switch PHY in transmit only mode will experience 100BASE-TX transmit re-synchronization problems upon waking the NIC PHY because there will be a reasonable timeframe between when the Switch wakes the NIC PHY 124 out of LS mode 330 (LSEN=0) and when the workstation having the NIC PHY is able to transmit a meaningful operating system level packet back to the Switch PHY 418. Here, the NIC PHY will restart transmitting a continuous scrambled idle sequence once it is woken. Thus, the delay between when the switch sends the wake-up and when the $1^{st}$ data packet is returned to the switch from the NIC PHY, should give the Switch PHY 418 adequate time to recover receiver operation if required, as scrambled idles 520 will have been received by the Switch PHY for a reasonable period of time before the data packet is received.

i. Next Page Auto-Negotiation of Link Suspend

In an embodiment, during the auto-negotiation state 310, the PHY and partner PHY may indicate their ability to support link-suspend mode 330 by employing auto-negotiation Next Page. Auto-negotiation Next Page permits additional parameters to be exchanged with the remote PHY, allowing reconfiguration of those parameters along with indications of the higher layer wake-up modes employed within the node. Use of Next Page requires a simple extension to the IEEE auto-negotiation standard to recognize the link-suspend Next Page message ID. For example, the message ID may be temporarily set to #20hex, although other appropriate values may also be used (e.g. as a result of any standardization efforts). Further, a control bit may be present to enable or disable the link-suspend auto-negotiation capability described within. As illustrated in FIG. 6, a control bit, link-suspend auto-negotiation (LSAN) 622, is identified for this purpose. Moreover, PHY Wake Up Code 624 and link partner Wake Up Code 626 can be contained in the registers allowing either PHY to notify the other PHY of the type of packet the PHY needs to be sent to be woken up (for instance out of a WOL suspended mode).

According to an embodiment, following a reset, if LSAN 622 is set, then the PHY will support the Next Page Link Suspend Auto-Negotiation scheme. Here, LSAN defaults to off (zero) following a power on reset, but is not affected by a soft reset to support Next Page auto-renegotiation of LS mode. Hardware control pins may be implemented that allow the default value of LSAN to be set to facilitate applications that do not wish to use higher layer software to change this setting (e.g. multi-port PHYs in switch applications).

As mentioned above, a mechanism, referred to as Next Page, may be used for passing operational parameters between PHYs during link negotiation. The IEEE 802.3 auto-negotiation standard, as described in IEEE 802.3 Standard for CSMA/CD Access method and Physical Layer Specifications, Section 28.2.3.4, is one example of such a mechanism, but other valid ones may also be implemented. As governed by the exiting IEEE standard, support of a link-suspend parameter exchange requires the assignment of a link-suspend Next Page message ID. A control register, link-suspend message ID (LSMSGID) 630 is identified for setting the Next Page message ID parameter. This may either be a hardwired value within the PHY or a programmable register that may be setup by the controller interfacing to the PHY (e.g. see the LS modified MII registers above).

FIG. 7 is a register bit map of an auto-negotiation message Next Page 700 and example link suspend Next Page code words, in accordance with an embodiment of the invention. In this example, an unformatted Next Page #1 702, and unformatted Next Page #2 704, are shown following the message Next Page 700. Here, using the IEEE standard, the Next Page scheme provides a means of transmitting 16-bit Next Page words (700, 702, and 704, either message or unformatted Next Pages) to a partner PHY. Although the Next Page scheme is described here, various other appropriate combinations of registers may be used for link negotiation.

The auto-negotiation message Next Page 700, comprises of a Link Suspend message ID (LSMsgID 630) in bits D0–10, and reserved bits 628 in bits D11–15 for providing message parameters and control (e.g. Next Page flags). The 11 bit Link Suspend message ID indicates that further pages to follow provide additional link-suspend code words in the unformatted code word format.

The unformatted Next Page #1 702, comprises 11 bit code word link suspend code word #1 720, and reserved bits 628 in bits D11–15 for providing message parameters and control (e.g. Next Page flags). Similarly, the unformatted Next Page #2 704, comprises link suspend code word #2 740, and reserved bits 628 in bits D11–15 for providing message parameters and control (e.g. Next Page flags).

The link-suspend code word #1 720, provides the basic parameters to set up link suspend operation 330. Link-suspend code word #2 740, is optionally sent, only if a bit field of the first link-suspend code word is set, indicating there is further information to be sent. Examples of parameters sent in the two code words, according to an embodiment, are described below. The bits in the words are recognized by a "D", followed by the bit number, beginning with "0", as illustrated in FIG. 7.

Link-suspend Code Word #1 720 (D0–D10) bit D0=LSAV 302

=0 Link-suspend Not Enabled (but PHY is capable)

=1 Link-suspend Capable (enabled if both link partners are capable)

bit D1=LSPMode 620 (required by this PHY—remote PHY must support request)

=0 PHY transmits LSPs and receives LSPs during link-suspend operation

=1 PHY transmits LSPs but requires standard idles during link-suspend mode in order for the receiver to operate correctly (remote PHY must ensure that when it sees this it does not transmit LSPs during link-suspend idle state).

bits D2–D3=LSPExp 614 (LSP receive timeout)

value 0=2×LSPPeriod value (default)

value I=3×LSPPeriod value value 2=4×LSPPeriod value value 3=off (never times out)

bits D4–D5=LSPPeriod 532 (LSP pulse spacing)

value 0=512 ms (default)

value I=2×512 ms value 2=3×512 ms
value 3=4×512 ms
bits D6–D9=LSPWidth 534 (minimum pulses required by this PHY to operate)
value 0=16 symbols (default)
value n=(n−1)×16 symbols (where n=2–15)
(Optional) Link-suspend Code Word #2 740 (D0–D10)
bits D0–D2=WakeUpCode 624 (see examples below)
bits D3–D10=reserved 628
Note that these are example assignments, and various other appropriate message, word, and bit combinations may be used for varying implementations of link-suspend.

j. Wake-up Codes

In an embodiment, a PHY may use a second link-suspend code word 740, during auto-negotiation 310, to advertise additional parameters to remote partner PHYs. For example, three bits of Link Suspend Code Word #2 740 may be reserved for indicating the packet required by the node to "wake up" from a sleep state or to perform Wake-on LAN (WOL) operations. The network operating system driver is required in this case to write a meaningful value to the WakeUpCode field 624 of a register within the PHY device. This capability permits a LS Switch PHY 418 to recognize, which end stations or attached partner LS NIC PHYs 424 are sleep capable, along with what packet types or link conditions can be used to wake up each sleep capable node, without the need or intervention of higher layer protocols. The switch may use the codes to employ additional filtering schemes (that recognize the appropriate packet required by a sleeping node) thereby preventing unscreened packets from reaching the end station unless they meet the WOL criteria (i.e. are the appropriate wake up packet).

For an embodiment, example Wake-up codes 624 may be as follows:

=000 Not defined (NIC—default)
=001 Originator of wake up packet (normally a switch port)
=010 Wakeup using Link Status change
=011 Wakeup using Magic Packet
=100 Wakeup using Masked Packet (e.g. OnNow)
=101–110—User defined
=111—Reserved for future use (e.g. Wake up code expansion control word in a further link suspend code word)

For this embodiment, a code value of zero simply means the software has left the Wake-up code undefined. Thus, none-zero values are advertised by a NIC supporting a form of sleep mode that requires a wakeup packet to resume operation. Note that a switch is usually the originator or forwarder of the wake up packet, with WakeUpCode=001. Also, note that where both PHY's WakeUpCodes are non-zero, either node may be woken up or originate wake-up frames (e.g. switch-to-switch connections). Thus, the link-suspend scheme is programmable and facilitates adjustment of key operational parameters, such as wake-up codes, to enable fine-tuning to match an application's particular needs and intensity of data traffic.

According to an embodiment, an additional benefit of the invention is that a network manager may poll the switches in a network and determine which PC/workstations are currently sleeping, awake or turned off completely, by interrogating the switch management information base (MIB), independent of the PC/workstations being awake or not. Here, the LSAV and LPLSAV flags, which are used internally by the PHY, can also made available to the MAC or Switch after link negotiation. Thus, the MAC level controller can determine if a link is link suspend-capable by polling a link-suspend available (LSAV) status bit via the LS modified MII register, and store the result in a MIB register for system level access.

Similarly, an embodiment allows more intelligent and power sensitive network devices (e.g. switch/hub devices) to be manufactured that can recognize a sleep capable attached node without the need for higher-level protocol support. The recognition is supported through a low-level mechanism for passing link power management parameters and WOL operational modes between WOL capable network devices. In the example of a PC LAN adapter and a LAN switch or hub device, the switch can simply read a PHY register (LPLSAV in the LS modified MII) to determine if a remote partner PHY (and NIC's) has sleep or WOL capability. Moreover, an embodiment allows a switch receiving enough LSPs to indicate that its remote partner is asleep, to poll the switch manager to determine what type of wake up packet to send to wake up the sleeping partner node, by reading the sleeping partner's wake up code register.

k. Invention Construction

FIG. 8 is a general block diagram of a modified LS capable PHY network device 800 for providing low power Link Suspend pulses and protocol, showing key functional components, in accordance with an embodiment of the invention. As illustrated, a standard PHY requires several changes in order to support the additional LS negotiation, mode, and states. Also, implementing the invention as an enhancement to a standard PHY facilitates backwards compatibility. Thus, FIG. 8 illustrates the high level PHY functions that may be modified to create a LS capable PHY from a current PHY (e.g. from a typical prior PHY 200 as shown in FIG. 2, to a LS capable PHY 800 as shown in FIG. 8).

FIG. 8 illustrates an embodiment comprising a LS modified MII registers and interface logic component 802, connected to a Link Suspend state machine 801, a transmit PHY functions and LSP function component 804, a receive PHY functions and LSP support circuits component 806, and a modified auto-negotiation state machine with Next Page link suspend support 816. In turn, the Link Suspend state machine 801 is also connected to the transmit PHY functions and LSP function component 804, a modified LS capable transmitter circuits 808, and the receive PHY functions and LSP support circuits component 806. The transmit PHY functions and LSP function component 804, is also connected to modified LS capable transmitter circuits 808. Likewise, the receive PHY functions and LSP support circuits component 806, is also connected to a normal and fast link pulse and valid frame detector 214, and a modified LS capable receiver circuits 810. The modified LS capable transmitter circuits 808, is also connected to a normal and fast link pulse generator 212. The modified LS capable receiver circuits 810, is also connected to the normal and fast link pulse and valid frame detector 214. The modified auto-negotiation state machine with Next Page link suspend support 816, is also attached to the normal and fast link pulse generator 212, and the normal and fast link pulse and valid frame detector 214.

In an embodiment, the link suspend state machine 801 provides overall control of the PHY link suspend functions of the system. The state machine may be a standalone state machine as shown in FIG. 8, or integral to the receive or transmit PHY function components, which may be state machines too.

Likewise, according to an embodiment, the LS modified MII Registers and Interface Logic component 802, provides a common interface for connecting the LS capable PHY 800 with different types of standardized MACs so that different vendors can design standardized products that will successfully interface with the LS PHY. For example, devices supporting the link suspend modes may be pin compatible with the existing PHY chip devices, allowing products with the existing chip devices to later upgrade in hardware, or migrate in design to a low power LS version in order to support the LS mode without hardware or board level changes. However, various other appropriate PHY interfaces, such as RMII, SMII, GMII, for example, may also be used.

Additional control and status registers 600, may be located in the LS modified MII registers and interface logic component 802 to monitor and control link suspend operation. For example, a Link Suspend Control 606, Link Suspend Partner Status 604, and Link Suspend Message ID 602 registers may be employed having bit significance as shown in FIG. 6.

Further, in the invention according to one embodiment, the modified auto-negotiation state machine and associated logic 816, may support recognition of and provision of various parameters of a link suspend partner PHY. For example, the modified auto-negotiation state machine may use Next Page link suspend support to provide to the pulse generator 212 and recognize from the frame detector 214, various parameters used to initiate and control communications and link suspend operations. Thus, the modified auto-negotiation block is responsible for negotiating with its remote LS capable PHY partner to achieve the desired communications modes.

For instance, the modified negotiation state machine may transfer and/or receive parameters that alter the behavior of a LS PHY's receiver in order to match the characteristics of a partner LS PHY's transmitter; or to dictate a specific link-suspend mode necessary for the a LS PHY's receiver circuits to operate correctly, as illustrated in FIGS. 4, 6, and 7.

The transmit PHY functions and LSP function component 804, controls the modified LS capable transmitter circuits 808, which transmit across the wired link 122. Likewise, the receive PHY functions and LSP support circuits component 806, controls the modified LS capable receiver circuits 810, which receive data from the wired link 122. The normal and fast link pulse generator 212 provides the timing pulses for the modified LS capable transmitter circuits 808. Similarly, the normal and fast link pulse and valid frame detector 214 provides receipt triggering for the modified LS capable receiver circuits 810.

Moreover, the modified transmitter function 804 and associated circuits 808: (1) support the generation of link suspend pulses 530 and (2) consume less power when transmitting a series of link suspend pulses 530 as compared to prior standard link idle state transmissions 520, and (3) switch the majority of the powered up circuits off between link-suspend pulses 530 in order to reduce the average power consumption of the PHY to a minimum, as illustrated in FIG. 5.

Additionally, the modified receiver function 806 and associated circuits 810: (1) support detection of valid link suspend pulses 530, (2) detects loss of link suspend pulses by timing the interval between valid link suspend pulses, and (3) recover from the link-suspend idle state 338, upon receipt of a valid packet or frame without the loss of the incoming data, as shown in FIG. 5.

Although certain embodiments have been described, the invention may be designed in such a way that it fully inter-operates with prior network devices when the link suspend features are disabled and will only use link suspend features with another network device having some of the similar capabilities.

The physical layer link suspend operation system described above is for purposes of example only. An embodiment of the invention may be implemented in any type of network method, apparatus, device, mode, state, in any network environment, or across any network media. For example, it may be used as a stand-alone system, or the apparatus may be coupled to other similar apparatus, PHYs, or network device across any type of network (e.g., LAN, WAN, PSTN, Internet, Cable TV, cellular, satellite, etc.), or any combination thereof.

Thus, a method and apparatus for supporting a physical layer link-suspend operation between network nodes has been described. Particular embodiments described herein are illustrative only and should not limit the present invention thereby. The invention is defined by the claims and their full scope of equivalents.

What is claimed is:

1. An apparatus comprising:
   a link suspend device comprising a low power communications mode, said low power communications mode comprising transmission of at least one link suspend pulse;
   a plurality of link suspend registers for monitoring and controlling said low power communications mode, said plurality of link suspend registers maintaining characteristics of said link suspend pulse; and
   a transmitter comprising a plurality of circuit elements coupled to said link suspend device, said transmitter configured to transmit said link suspend pulses and to power down at least one of said plurality of circuit elements between said transmissions of said link suspend pulses.

2. The apparatus of claim 1, further comprising a generator coupled to said transmitter, said generator configured to provide timing pulses to said transmitter.

3. The apparatus of claim 1, further comprising a transmit functions controller coupled to said transmitter, said transmit functions controller configured to provide control of said transmitter.

4. The apparatus of claim 1, further comprising a receiver coupled to said link suspend device.

5. The apparatus of claim 4, wherein said receiver is configured to detect valid ones of said link suspend pulses.

6. The apparatus of claim 5, wherein said receiver is configured to detect the absence of said link suspend pulses.

7. The apparatus of claim 4, wherein said receiver is configured to detect a valid data frame template while in said low power communications mode.

8. The apparatus of claim 7, wherein said link suspend device is configured to continue said low power communications mode upon receipt of a valid data frame template and process data contained in said valid data frame template.

9. The apparatus of claim 7, wherein upon receipt of a valid data frame template said link suspend device is configured to:
   bring a host device coupled to said link suspend device out of a sleep state;
   process data contained in said valid data frame template; and
   continue said low power communications mode.

10. The apparatus of claim 4, further comprising a detector coupled to said receiver, said detector configured to detect normal and fast link pulses.

11. The apparatus of claim 10, wherein said detector is configured to detect valid data frame templates.

12. The apparatus of claim 10, further comprising a receive functions controller coupled to said receiver, said receive functions controller configured to provide control of said receiver.

13. The apparatus of claim 4, further comprising a negotiation device coupled to said transmitter, said negotiation device configured to negotiate a communications link.

14. The apparatus of claim 13, wherein said negotiation device is further configured to provide at least one first link parameter to at least one link partner, and receive at least one second link parameter from said at least one link partner.

15. The apparatus of claim 14, wherein said first and said second link parameters comprise information for initiating and controlling said low power communications mode.

16. The apparatus of claim 14, wherein said parameters comprise a wake-up code for identifying a data packet that upon receipt will bringing a host device attached to said link suspend device out of a sleep state.

17. The apparatus of claim 16, wherein said wake-up codes are transmitted and received, using Next Page messages.

18. The apparatus of claim 14, further comprising:
a mode control parameter for transmitting to said link partner, said mode control parameter configured to cause said partner to suspend transmission of link suspend pulses and continue to receive link suspend pulses.

19. The apparatus of claim 13, wherein said negotiation device comprises an auto negotiation device.

20. The apparatus of claim 1, wherein said transmitter is further configured to power down at least one of said plurality of circuit elements between transmissions of valid data templates.

21. The apparatus of claim 1, further comprising an interface coupled to said link suspend device, said interface configured to interface with a media controller.

22. The apparatus of claim 21, wherein said interface further comprises at least one register and interface logic for initiating and controlling said low power communications mode.

23. The apparatus of claim 22, further comprising:
a register for providing a link partner with a wake-up code, said wake-up code configured to notify a host device attached to said link suspend device of a wake up mode employed by said link suspend device; and
a register for receiving and recording a partner wake-up code, said partner wake-up code configured to notify a host device attached to a link partner of said wake up mode employed by said link suspend device.

24. The apparatus of claim 21, wherein said interface is configured to receive a first set of data from said media controller for transmitting onto a link, and is configured to provide a second set of data received from said link to said media controller.

25. The apparatus of claim 21, wherein said plurality of link suspend registers comprises an identification register, said identification register configured to provide to a link partner, information used to define operational parameters for link partner operation related to said suspend pulses.

26. The apparatus of claim 25, wherein said plurality of link suspend registers comprises a control register, said control register configured to provide to a link partner, information used to initiate and control said low power communications mode.

27. The apparatus of claim 26, wherein said plurality of link suspend registers comprises a status register, said status register configured to receive and retain from a link partner, information used to initiate and control said low power communications mode.

28. An apparatus comprising:
a link suspend device comprising a low power communications mode, said low power communications mode comprising transmission of at least one link suspend pulse;
a transmitter comprising a plurality of circuit elements coupled to said link suspend device, said transmitter configured to transmit said link suspend pulses and to power down at least one of said plurality of circuit elements between said transmissions of said link suspend pulses;
a receiver coupled to said link suspend device, said receiver configured to detect said link suspend pulses and data frame templates while in said low power communications mode;
a detector coupled to said receiver, said detector configured to detect normal link pulses, fast link pulses, and valid data frame templates;
a plurality of link suspend registers for monitoring and controlling said low power communications mode;
a negotiation device coupled to said link suspend device, said negotiation device configured to negotiate a communications link; and
an interface coupled to said link suspend device, said interface configured to interface with a media controller.

29. The apparatus of claim 28, wherein said apparatus comprises a computer network physical layer device.

30. The apparatus of claim 28, wherein said transmitter is further configured to power down at least one of said plurality of circuit elements between transmissions of valid data templates.

31. The apparatus of claim 28, wherein said plurality of link suspend registers comprises:
an identification register coupled to said link suspend device, said identification register configured to provide to a link partner, a first set of information used to define operational parameters for link partner operation related to said link suspend pulses;
a control register coupled to said link suspend device, said control register configured to provide a second set of information used to initiate and control said low power communications mode with a link partner; and
a status register coupled to said link suspend device, said status register configured to receive and retain a third set of information used to initiate and control said low power communications mode with a link partner.

32. A method for providing a low power communications mode, comprising:
negotiating a link with a link partner, wherein said negotiating comprises:
transmitting to said link partner parameters identifying available communications modes;
receiving from said link partner parameters identifying available link partner communications modes;
receiving from said partner parameters identifying a low power communications mode as one of said available link partner communications modes;
entering said low power communications mode;
transmitting at least one link suspend pulse;
powering down at least one of a plurality of transmitter circuit elements between transmission of said link suspend pulses;
receiving a signal from said link partner;
detecting a receive link suspend pulse in said signal;
detecting a receive data frame template in said signal;

supporting said link during detection of said receive data frame template;

interpreting receive data contained in said receive data frame templates;

providing said receive data to a media controller;

obtaining transmit data from said media controller;

transmitting said transmit data in a transmit data frame template onto said link.

33. A method for providing a low power communications mode, comprising:

negotiating a link with a link partner;

receiving a first set of parameters identifying a low power communications mode as one of available communications modes of said link partner, and storing said first set of parameters in a first link suspend register;

transmitting a second set of parameters from a second link suspend register identifying said low power communications mode as one of available communications modes;

entering said low power communications mode;

transmitting at least one link suspend pulse during said low power communications mode;

powering down at least one of a plurality of transmitter circuit elements between transmission of said link suspend pulses.

34. The method of claim 33, wherein said negotiating comprises:

transmitting to said link partner said second set of parameters identifying available communications modes;

receiving from said link partner said first set of parameters identifying available link partner communications modes.

35. The method of claim 34, wherein said negotiating comprises transmitting to said partner parameters identifying available communications modes, wherein said negotiating further comprises receiving from said link partner parameters identifying available link partner communications modes.

36. The method of claim 34, further comprising the steps of:

detecting a receive link suspend pulse in a signal from said link partner;

detecting a receive data frame template in said signal;

bringing a host device coupled to a link suspend device out of a sleep state upon receipt of a valid data frame template;

processing data contained in said valid data frame template; and continuing said low power communications mode.

37. The method of claim 36, further comprising reentering said negotiating upon loss of said low power communications mode.

38. The method of claim 34, wherein said negotiating further comprises:

retaining parameters for said negotiating of said link;

transmitting to said link partner parameters identifying said low power communications mode as one of said available communications modes;

receiving from said link partner link partner parameters identifying said low power communications mode as one of said available communications modes of said link partner;

transmitting to said link partner information identifying transmit link suspend pulses to be transmitted to said link partner; and receiving from said link partner information identifying receive link suspend pulses to be received from said link partner.

39. The method of claim 33, further comprising steps of:

receiving a signal from said link partner;

detecting a receive link suspend pulse in said signal;

detecting a receive data frame template in said signal;

detecting absence of said link suspend pulses transmitted by said link partner;

supporting said link during detection of said receive data frame template;

providing receive data in said receive data frame template to a media controller;

obtaining transmit data from said media controller; and transmitting said transmit data in a transmit data frame template onto said link.

40. The method of claim 33, further comprising:

transmitting at least one valid data template while in said low power communications mode; and powering down at least one of said plurality of transmitter circuit elements between transmission of said valid data templates.

41. The method of claim 40, further comprising the steps of:

continuing, said low power communications mode;

discontinuing said transmission of said link suspend pulses; and transmitting data frame templates.

42. The method of claim 33, further comprising the steps of:

controlling said low power communications mode with a link suspend controller;

discontinuing said low power communications mode upon receipt of a data frame template containing data requesting said low power communications mode to be discontinued.

43. The method claim 33, further comprising the steps of:

continuing said low power communications mode upon receipt of a valid data frame template; and processing data contained in said valid data frame template.

44. The method of claim 33, further comprising:

detecting received link suspend pulses in a signal;

discontinuing said low power communications mode upon discontinuation of said detection of said link suspend pulses.

45. The method of claim 33, further comprising:

detecting receive data frame template in a signal;

detecting timing pulses of said receive data frame template with a pulse detector; and interpreting receive data contained in said receive data frame templates.

46. The method of claim 45, further comprising:

discontinuing said low power communications upon discontinuation of said detection of said receive data frame template.

47. The method of claim 33, further comprising:

transmitting a mode control parameter to said link partner, said mode control parameter configured to cause said link partner to discontinue transmitting link suspend pulses while said link partner continues receiving link suspend pulses.

* * * * *